United States Patent [19]
Nanba et al.

[11] Patent Number: 5,874,905
[45] Date of Patent: Feb. 23, 1999

[54] NAVIGATION SYSTEM FOR VEHICLES

[75] Inventors: Akimasa Nanba; Kiyohide Kato, both of Anjo, Japan

[73] Assignee: Aisin AW Co., Ltd., Japan

[21] Appl. No.: 698,258

[22] Filed: Aug. 14, 1996

[30] Foreign Application Priority Data

Aug. 25, 1995 [JP] Japan ................................. 7-217866
Apr. 26, 1996 [JP] Japan ................................. 8-107921

[51] Int. Cl.$^6$ ................................. G08G 1/123
[52] U.S. Cl. .................. 340/995; 340/988; 340/990; 701/202; 701/209; 701/211
[58] Field of Search .................. 340/995, 988, 340/990; 701/200, 201, 202, 203, 209, 211; 345/123, 125, 121, 122

[56] References Cited

U.S. PATENT DOCUMENTS

| | | | |
|---|---|---|---|
| 5,206,811 | 4/1993 | Itoh et al. ................................. | 701/211 |
| 5,434,591 | 7/1995 | Goto et al. ................................. | 345/123 |
| 5,613,055 | 3/1997 | Shimoura et al. ........................ | 395/173 |

FOREIGN PATENT DOCUMENTS

| | | |
|---|---|---|
| 0406946 | 1/1991 | European Pat. Off. . |
| 0579451 | 1/1994 | European Pat. Off. . |
| 0660290 | 6/1995 | European Pat. Off. . |
| 4035979 | 6/1991 | Germany . |

OTHER PUBLICATIONS

IEEE–IEE Vehicle Navigation—Information Sys. Conference Oct. 12–15, 1993, pp. 419–422.

Primary Examiner—Benjamin C. Lee
Attorney, Agent, or Firm—Lorusso & Loud

[57] ABSTRACT

The vehicular navigation system of the present invention includes a present position detector for detecting the present position of a vehicle, an input device for inputting a destination, an information memory for storing road data for searching for an optimal route, a route search system for searching for an optimal route to the destination based on the road data stored in the information memory, a route information converter for converting the route information near the present position of the vehicle to a visually 3-dimensional route information based on configuration of the road by the route search system, and a display for outputting and displaying the route information converted by the route information converter. The present position of the vehicle is detected, and the present position of the vehicle and route information ahead of the present position can be easily confirmed by detecting the present position of the vehicle and by converting the route information of the present position, based on the configuration of the road, to a 3-dimensional road display.

26 Claims, 25 Drawing Sheets

FIG. 2(A)

Suggested road data

| | Number of roads (n) | |
|---|---|---|
| 1 | Road number | |
| | Length | |
| | Road attribute data | |
| | Configuration data address & size | |
| | Guidance data address & size | |
| | ⋮ | |
| n | Road number | |
| | Length | |
| | Road attribute data | |
| | Configuration data address & size | |
| | Guidance data address & size | |

FIG. 2(B)

Configuration data

| | Number of nodes (m) |
|---|---|
| 1 | East longitude |
| | North latitude |
| | Heading |
| | ⋮ |
| m | East longitude |
| | North latitude |
| | Heading |

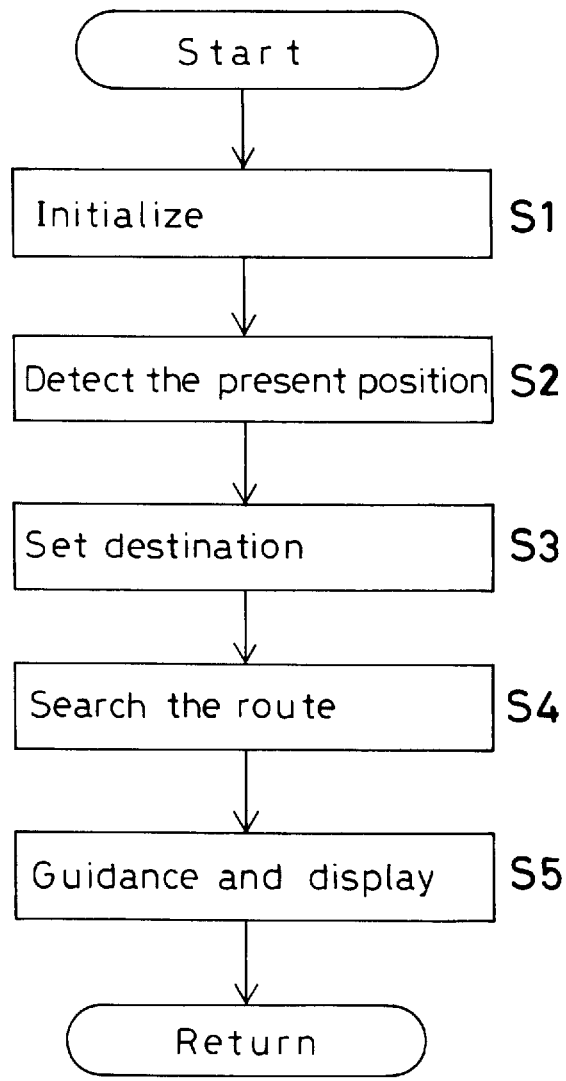

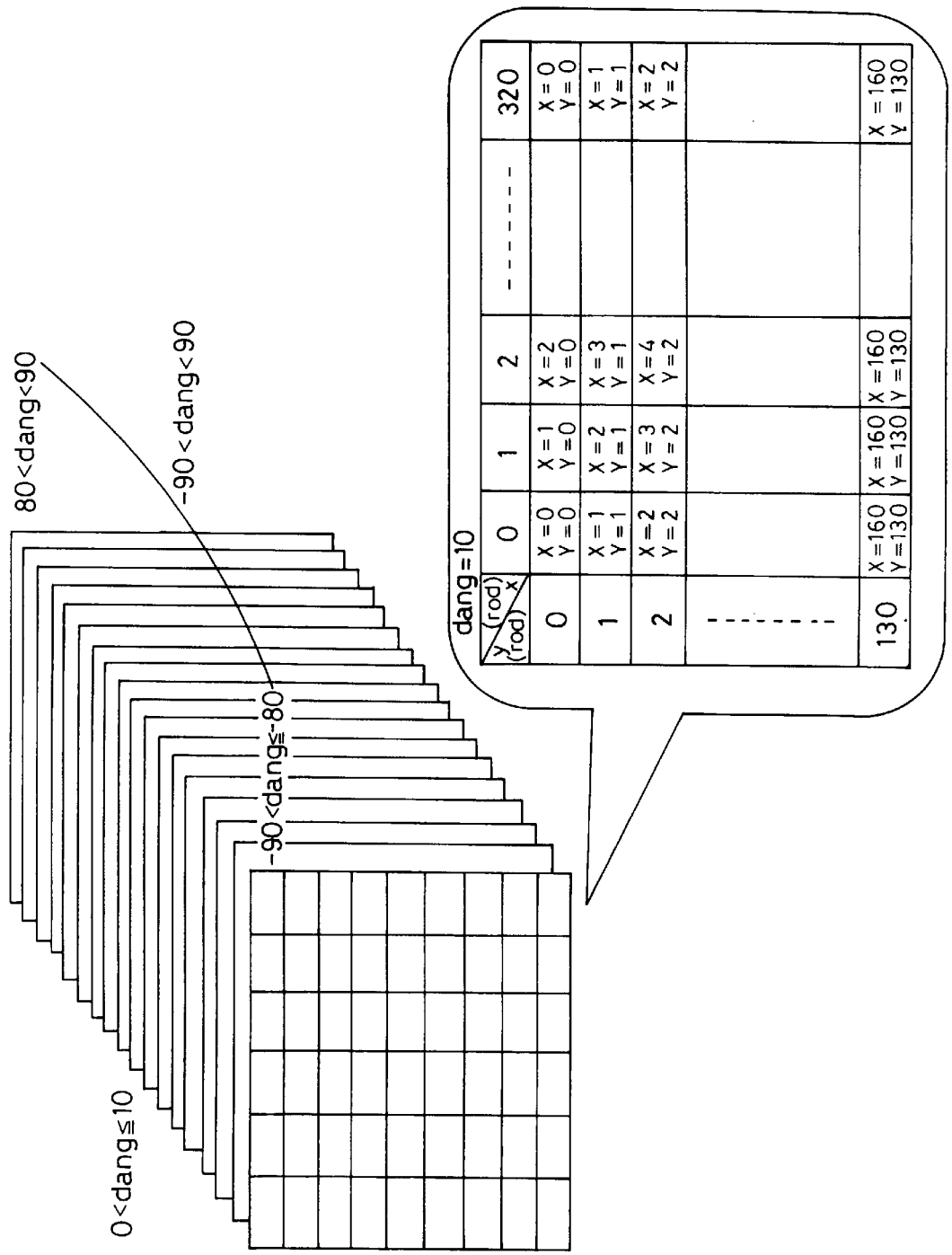

FIG. 14 (A)
Suggested road data

| Number of rodes (n) | |
|---|---|
| 1 | Road number |
| | Length |
| | Road attribute data |
| | Configuration data address and size |
| | Guidance data address & size |
| ⋮ | |
| n | |

FIG.14(B)
Configuration data

| Number of nodes (m) | |
|---|---|
| 1 | East longitude |
| | North latitude |
| ⋮ | |
| m | |

FIG.14(C)
Guidance data

| Intersection name |
|---|
| Precaution point data |
| Road name data |
| Road name audio data address & size |
| Destination data address & size |

FIG.14(D)
Destination data

| Number of destinations (k) | |
|---|---|
| 1 | Destination road number |
| | Destination name |
| | Destination name audio data address & size |
| | Destination direction data |
| | Traveling guidance data |
| ⋮ | |
| k | |

FIG.14(E)
Destination direction data

- −1: Invalidity
- 0: Not necessary
- 1: Go straight ahead
- 2: Rightward direction
- 3: Diagonally rightward direction
- 4: Direction to return to right
- 5: Leftward direction
- 6: Diagonary leftward direction
- 7: Direction to return to left

FIG. 15 (A)

Road attribute data

Yes/no information Yes: ○ 

| Overpass/ underpass data | Overpass | |
|---|---|---|
| | Alongside overpass | |
| | Underpass | ○ |
| | Alongside underpass | |
| Number of lanes | 3 lanes or more | |
| | 2 lanes | ○ |
| | 1 lanes | |
| | No center line | |

FIG. 15 (B)

Road name data

| Road type | In-type number |
|---|---|

| | | | |
|---|---|---|---|
| | Expressway | Main line | 1 |
| | | Ancillary road | 2 |
| | Municipal expressway | Main line | 3 |
| | | Ancillary road | 4 |
| | Toll road | Main line | 5 |
| | | Ancillary road | 6 |
| General road | National road | | 7 |
| | Prefectural road | | 8 |
| | Others | | 9 |

FIG.16 (A)

Precaution point data

| Railroad crossing | O |
|---|---|
| Tunnel entrance | |
| Tunnel exit | |
| Road with reduced point | |
| None | |

FIG.16 (B)

Travel guidance data

| Bear right | |
|---|---|
| Bear left | |
| Bear toward center | O |
| None | |

2nd branch point is near

2nd branch point is far

Display with equal magnification in longitudinal and lateral directions

Display with double magnification in lateral directions

NAVIGATION SYSTEM FOR VEHICLES

BACKGROUND OF THE INVENTION

The present invention relates to a navigation system for providing a driver of a vehicle with information on a route to a destination when the vehicle is driven along a route unfamiliar to the driver.

A vehicular navigation system is a system which searches for an optimal route from the present position of the vehicle or from a specified starting point to a destination based on inputted data such as the destination data, and provides the driver with information on a route to reach the destination, when the vehicle is driven along a road unfamiliar to the driver, by displaying a road map on a screen of a display unit, based on the suggested optimal route, and by displaying the suggested route or the present position of the vehicle on the map.

With regard to the display on the screen, a system has been known in the past in which a route is searched from the present position of the vehicle or from a destination based on inputted data such as a destination, a transit point, etc., and a suggested route is displayed on a map or the advancing direction is displayed by an arrow on an enlarged map. FIG. 28 represents a map, which shows a route to guide the vehicle to a destination (park marked with an asterisk) via a highway shown by a white line (outlined line). FIG. 29 is an enlarged view of an area near a branch point for guiding toward a route from PARI to an airport, and an arrow indicating the advancing direction from the branch point and a message "5.0 miles; 10 minutes to the destination" is displayed.

In a conventional type system as described above, the suggested route is drawn on a map as shown in FIG. 28, and the driver must find out the turning point and the turning direction by watching the map. Thus, it takes some time until the driver fully understands the situation. Also, in case the present position of the vehicle, the advancing direction, or the route already driven are displayed by the same magnification factor, it is difficult for the driver to discriminate between the information necessary for immediate guiding and other information. Because a large amount of information is displayed in addition to the information on the present position and it is not always easy to recognize the information on the present position, the display is not always satisfactory in terms of recognizability. For example, in case a road is curved, it is sometimes difficult to judge whether or not the road is curved.

Also, when an area is enlarged in the map as shown in FIG. 29 and the next guide branch point is not in the displayed area, this is inconvenient because the driver cannot find out the direction to be taken from that guide branch point. To solve this problem, it has been proposed to indicate two advancing directions for adjacent intersections on the suggested route. However, by simply displaying two advancing directions, it is not easy to judge which of the advancing directions should be chosen, and it is difficult to find out the next advancing direction.

SUMMARY OF THE INVENTION

To solve the above problems, it is an object of the present invention to provide a vehicular navigation system, by which route information near the present position of the vehicle is expressed 3-dimensionally based on the road configuration and information of the present position and on a route ahead of the present position of the vehicle is displayed as the vehicle moves, and by which it is possible to easily recognize information pertaining to the route immediately ahead during driving.

To attain the above object, a vehicular navigation system according to the present invention comprises a present position detecting means for detecting the present position of the vehicle, an input means for inputting a destination, an information memory means for storing road data to be searched in determining an optimal route, a route searching means for searching for a route to the destination based on the road data stored in said information memory means, a route information converting means for converting route information near the present position of the vehicle to a visual 3-dimensional route information based on configuration of a road as searched by said route searching means, and a display means for outputting and displaying the route information converted by said route information converting means.

In another embodiment the vehicular navigation system of the present invention comprises a present position detecting means for detecting the present position of the vehicle, an input means for inputting information necessary for calculating an optimal route, a display means for displaying information for route guidance, an information memory means for storing all necessary data for route guidance including guidance road data, a route searching means for searching for an optimal route based on the information inputted by said input means, a route information memory means for storing information of a route searched and suggested by said route searching means, and a guidance control means for reading two directions, i.e. the direction to be taken at the next guide branch point and at the next subsequent guide branch point, from said route information memory means based on the route searched by said route searching means and the present position detected by said present position detecting means and for outputting this direction information to said display means, whereby said guidance control means changes the drawing orientation for guidance information on the advancing direction at a second guide branch point based on the advancing direction at a first guide branch point.

It is thus possible according to the present invention to display information for the present position of the vehicle and a route ahead of the present position as the vehicle moves by expressing information for the route near the present position of the vehicle based on the configuration of the roads and to easily recognize such information for the route ahead during driving.

BRIEF DESCRIPTION OF THE DRAWINGS

FIGS. 2(A) and 2(B) illustrate data files of road data as used in the present invention;

FIG. 3 is a flow chart of one embodiment of a main routine for operation of a vehicular navigation system according to the present invention;

FIG. 13 is an illustration of data files utilized in the subroutine of FIG. 12;

FIGS. 14 (a)–(e) illustrate major data files related to another embodiment of the present invention;

FIGS. 15(A) and 15(B) are charts representing the data files of FIG. 14;

FIGS. 16(A) and 16(B) are charts representing additional data files of FIG. 14;

DESCRIPTION OF THE PREFERRED EMBODIMENTS

The following is a description of preferred embodiments of the present invention, with reference to the drawings.

Figure 1:
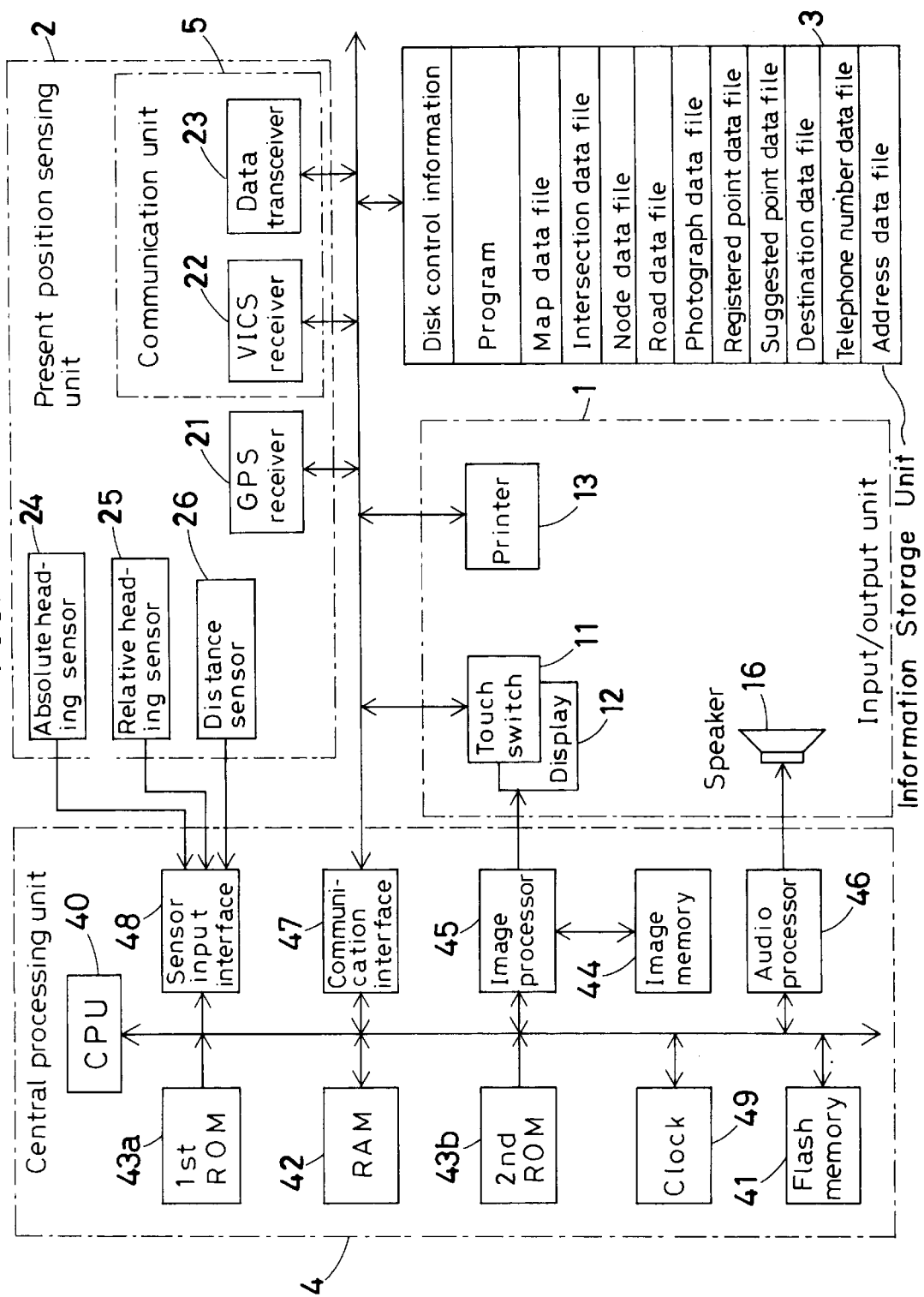
FIG. 1 is a block diagram of an embodiment of a vehicular navigation system according to the present invention.

FIG. 1 is a general block diagram of an embodiment of a vehicular navigation system according to the present invention. The vehicular navigation system according to the present invention comprises an input/output unit 1 for inputting and outputting information relating to route guidance, a present position detecting unit (present position detecting means) 2 for detecting information relating to the present position of the vehicle, an information memory unit (information memory means) 3 for storing navigation data necessary for calculating an optimal route guidance display and sound data required for route guidance and for storing programs (OS and/or application), and a central processing unit 4 for performing display/sound guidance processing necessary for route search processing and route guidance and for controlling the entire system. First, description will be given on arrangement of each component.

The input/output unit 1 functions to input a destination, to specify navigation processing to the central processing unit 4 at the request of the driver so that guidance information is given at least by either sound or screen when the driver needs such information and also to print data after the processing. As the means for fulfilling such functions, the input unit comprises a touch switch 11 and an operation switch (input means) for inputting the destination using telephone number or coordinates on a map or for requesting route guidance. Naturally, it may be an input unit such as a remote controller. The output unit comprises a display unit (output display means) 12 for displaying the inputted data on screen or for automatically displaying route guidance on screen upon the request of the driver, a printer 13 for printing data processed by the central processing unit 4 or data stored in the information storage unit 3, and a speaker for outputting route guidance by means of voice.

In this case, a voice recognizing unit for inputting voice or a card reader for reading data recorded on an IC card or magnetic card may be added. Also, a data communication unit may be added, by which it is possible to send or receive data to or from an information source such as a personal computer where the data specific to the driver such as map data, destination data, etc. are stored.

The display unit 12 comprises a color CRT and a color liquid crystal display, and all screens necessary for navigation such as a route setting screen, based on map data and guidance data processed by the central processing unit 4, a sector view screen, intersection view screen, etc. are outputted in color display. Further, buttons for setting route guidance, for guidance during route guidance and switching the screens are displayed. In particular, information on transit intersections, such as name of transit intersection, is outputted in pop art color display on the sector view screen.

The display unit 12 is installed on an instrument panel near the driver's seat, and the driver can confirm the present position of the vehicle by watching the map displayed and can obtain information on the route ahead. The display unit 12 is provided with a touch switch 11 corresponding to display of functional buttons. By touching the buttons, the above operation can be executed based on the inputted signal. An input signal generating means comprising these buttons and the touch switch constitutes the input unit, but detailed description is not given here.

The present position detecting unit 2 is to detect or receive information relating to the present position of the vehicle, and it comprises an absolute heading sensor 24 having a geomagnetic sensor and the like, a relative heading sensor 25 having a steering sensor, gyro, etc., a distance sensor 26 for detecting traveled distance from the number of revolutions of the wheels, a GPS receiver 21 utilizing the global positioning system (GPS), and a communication unit 5. The communication unit 5 comprises a VICS receiver 22 serving as traffic information acquiring means and a data transceiver 23. VICS (Vehicle Information & Communication System) is to transmit road traffic information at real time by means of FM multiplex (character broadcasting), radio beacon, optical beacon, etc. to vehicles. FM multiplex transmits crude information for a wider area, while the information transmitted by radio beacon and optical beacon is detailed information for a narrow area within about 10 km in radius around the beacon, and the information is received when the vehicle passes by the beacon. VICS transmission data contains degree of traffic congestion (e.g. closed to traffic, congestion, traffic jam, heavy traffic, normal traffic, etc.), the foremost position of congestion, length of congestion, traffic restriction (information on construction, no thoroughfare, etc.), traveling time (time required at a predetermined speed). The data transceiver is, for example, a portable telephone or a personal computer, by which information necessary for navigation is sent to or received from a traffic information center (such as ATIS) at the request of the driver.

The information storage unit 3 is an external storage unit, which stores navigation program and data in an external storage medium such as CD-ROM (hereinafter simply referred as "CD"), optical CD, IC card, etc. The program comprises a map drawing unit, a route searching unit, a route guidance unit, a present position calculating unit, a destination setting operation control unit, etc. and contains an application unit for signal processing of navigation and an OS unit. Here, programs for processing such as route searching, programs and data necessary for programs to execute display output control for route guidance and for audio output control for audio guidance, and further, display information data necessary for route guidance and map display are stored. The data stored include map data, intersection data, road data, various guidance data, and all data necessary for navigation.

More specifically, here are stored a program (route searching means) for setting a destination and a transit point based on positional information from the present position detecting unit 2 and on input signal from the input unit 11 and for executing route searching using the suggested road data, a program (route information converting means) for converting the suggested road data based on traffic information acquired from the communication unit 5 and for executing route searching again, a program for converting the suggested route to draw it 3-dimensionally, and a program for determining map drawing, map matching, audio output timing along the route and contents of voice phrases. By starting the programs stored in the information storage unit 3, the functions of navigation in the present invention are executed. Specifically, in the present embodiment, programs for executing the functions of the present invention are stored in the information storage unit 3, which serves as an external storage medium.

The central processing unit 4 is provided with a CPU 40 for executing various computation processings and flash memory 41 for reading and storing programs from the CD of the information storage unit 3. Even when programs on CD are changed, the flash memory 41 erases the existing programs enabling reloading. Further, there are provided a 1st ROM 43a for storing programs to check programs of the flash memory 41 and for carrying out updating of the flash memory (program reading means), a RAM 42 for temporarily storing guidance information for the suggested route such as coordinates of the preset destination, road code number, etc. or the data under computation, and a 2nd ROM 43b for storing display information data necessary for route guidance and map display. The program for updating as described above may be stored in the external storage unit.

Further, there are provided an image memory 44 where image data used for screen display by the display unit is stored, an image processor for picking up image data from the image memory based on display control signals from CPU 40 and for outputting it to the display unit 12 after image processing, an audio processor 46 for synthesizing voice, phrases, a sizable sentence, sound, etc. as read from RAM 42 based on audio output control signals from CPU 40 and sending it to the speaker 16 after converting to analog signal, a communication interface 47 to send or receive input/output data by communication, a sensor input interface 48 for picking up sensor signals of the present position detecting unit 2, and a clock 49 for entering date and time to internal dialog information.

When the data acquired by sensors of the present position detecting unit 2 is picked up by the sensor input interface 48 in the central processing unit 4, CPU 40 calculates coordinates of the present position at a given time interval and writes them temporarily in RAM 42. The present position coordinates are subjected to map matching by taking detection error of various data into consideration. Output values of various types of sensors are corrected and compensated continuously. The route guidance is carried out by screen display and voice output, and the driver can select whether voice output should be used or not.

FIG. 2 shows a part of the suggested (searched) road data file stored in the information storage unit 3, i.e. the data necessary for calculating the route by the route searching unit and for carrying out the route guidance. As shown in FIG. 2(A), the data include road number, length, road attribute data, and address and size of configuration data, and address and size of guidance data. The road number is an identification number for each of the road segments included in the map classified as outward course and return course for the road segments between branch points such as intersections. The road attribute data are the data showing the type of the road such as overpass, underpass, expressway, national road, general road, toll road, etc. The configuration data are the data showing configuration or shape of the road. As shown in FIG. 2(B), when each road is divided into a plurality of nodes, this includes coordinates such as east longitude or north latitude and heading data for each of the nodes of several meters in length. The guidance data include name of intersection (or branch point), presence or absence of traffic signal, data of landmark (such as traffic signpost, signboards of filling station, convenience store, etc.), precaution point data (such as railroad crossing, tunnel), road name data and destination data.

Figure 4:
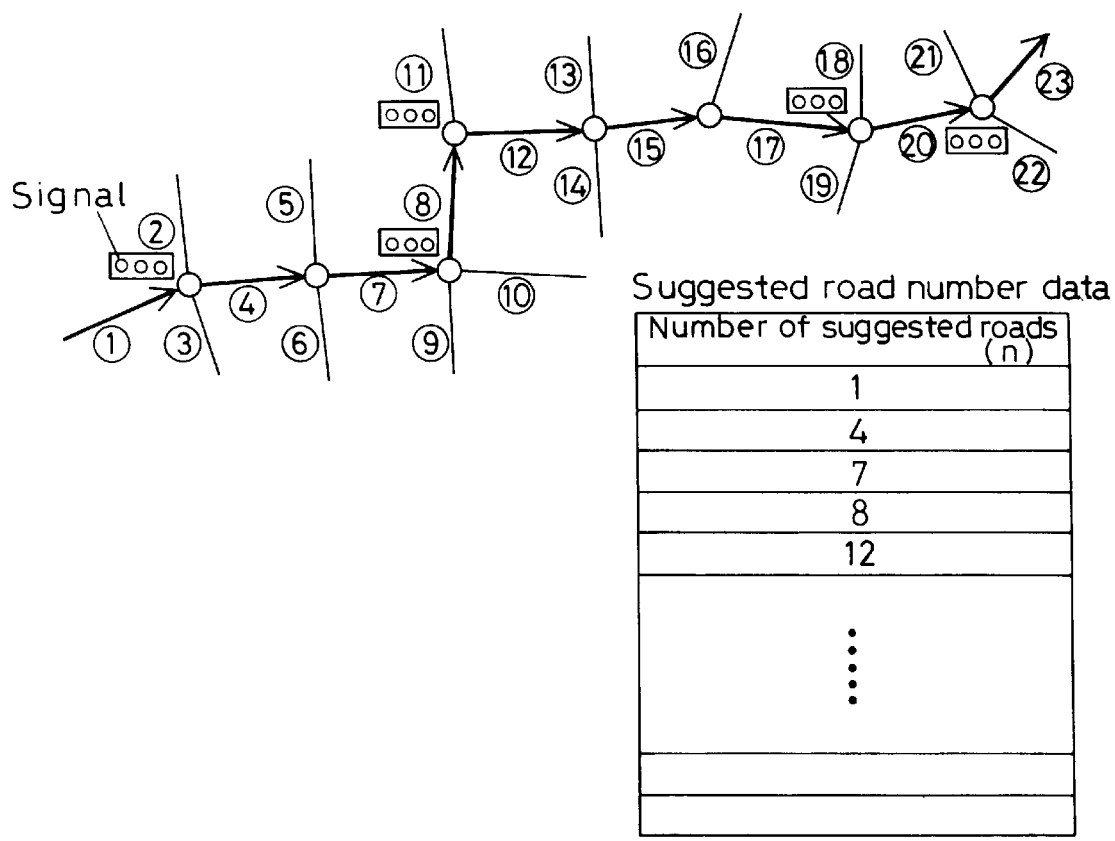
FIG. 4 illustrates a route and correlated road number data obtained by the searching routine of FIG. 3.

FIG. 3 is a flow chart of a routine for overall control of the entire vehicular navigation system according to the present invention. Initializing is carried out in Step 51. CPU 40 reads navigation program from CD-ROM and stores it in the flash memory 41. Based on this navigation program, the present position is detected by the present position detecting unit 2, and a map of the neighborhood is displayed around the present position, and name and other data of the present position are displayed (Step S2). Next, the destination is set using telephone number, address, name of facility, registered point, etc. (Step S3) and a route from the present position to the destination is searched (Step S4). The route to reach the destination is set as guidance road number data containing guidance road numbers as shown in FIG. 4. When the route has been determined, the present position detected by the present position detecting unit 2 is traced, and the route up to the destination is guided and displayed (Step S5).

Figure 5:
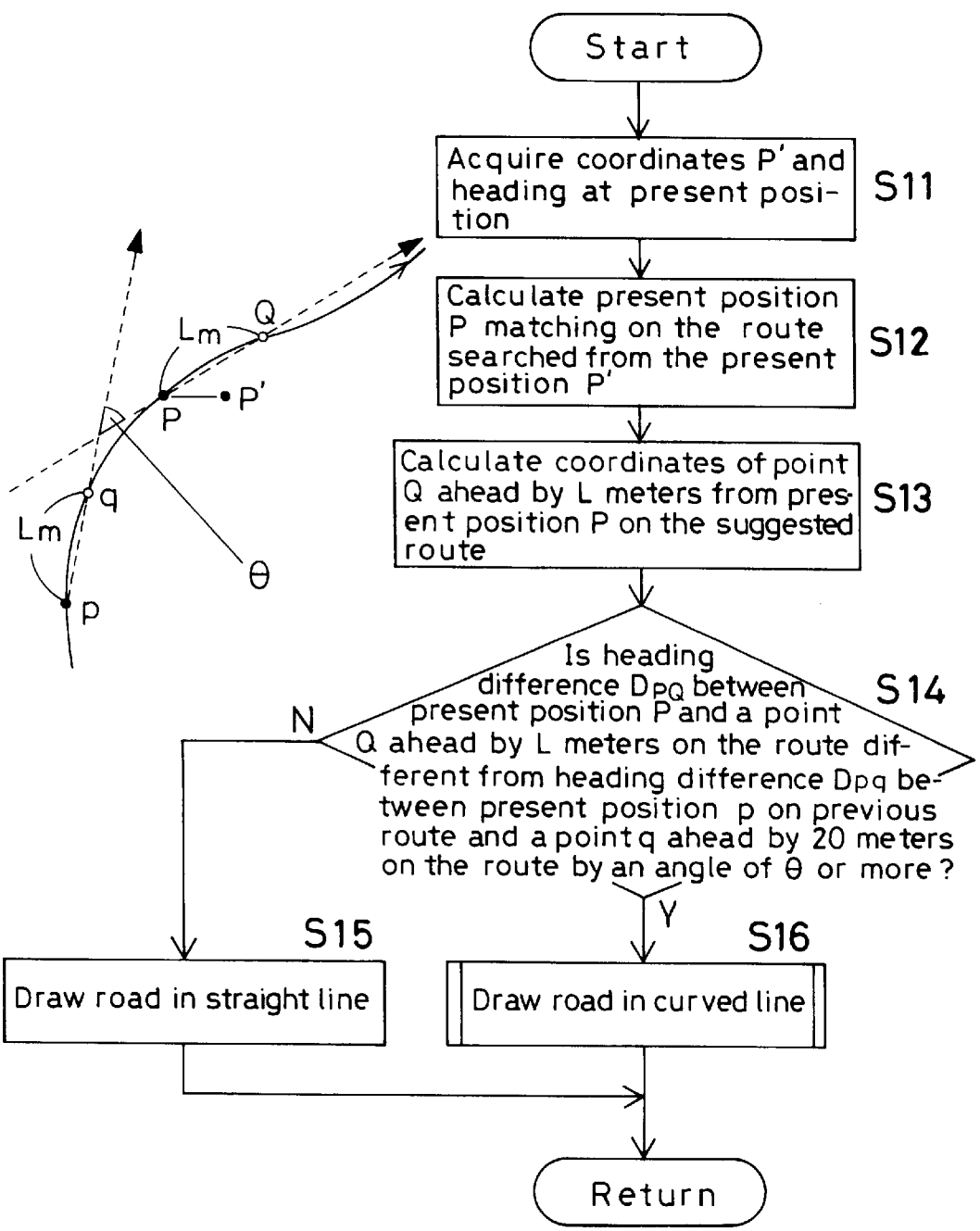
FIG. 5 is a flow chart showing a first embodiment of a subroutine for processing by route information converting means of the present invention (step S5 in FIG. 3) together with a diagram illustrating operation of the subroutine.

The present invention relates to processings to convert and display route information of the present position of the vehicle and the area ahead of the present position in the guidance and display processing of Step S5. First, description will be given on an aspect of the processing by the route information converting means of the present invention referring to FIG. S to FIG. 9. FIG. 5 is a basic flow chart showing an embodiment of the processing in the present invention. In Step S11, coordinates and bearings of the present position P' of the vehicle are acquired by the present position detecting unit 2. In Step S12, the present position P is calculated, which matches a route searched from the coordinates of the present position P'. Next, from the present position P on the route searched in Step S13, coordinates of a point Q in a given distance L meters (e.g. 10 to 50 m) ahead of the present position are calculated. (As shown in FIG. 2, bearings are stored in memory together with absolute coordinates of node data.) Next, in Step S14, it is judged whether or not an angular difference θ (i.e. crossing angle between straight line PQ and straight line pq) between bearing difference $D_{PQ}$ [between the present position P and the point Q by L meters ahead on the route] and a bearing difference $D_{PQ}$ [between the present position P on previous route and a point q ahead on the route by L meters] is wider than a predetermined angle (e.g. 2° to 10°). If it is less than the predetermined angle, the road is drawn in straight line. If it is equal to or more than the predetermined angle, the road is drawn in a curved line to match the angular difference.

Figure 6:
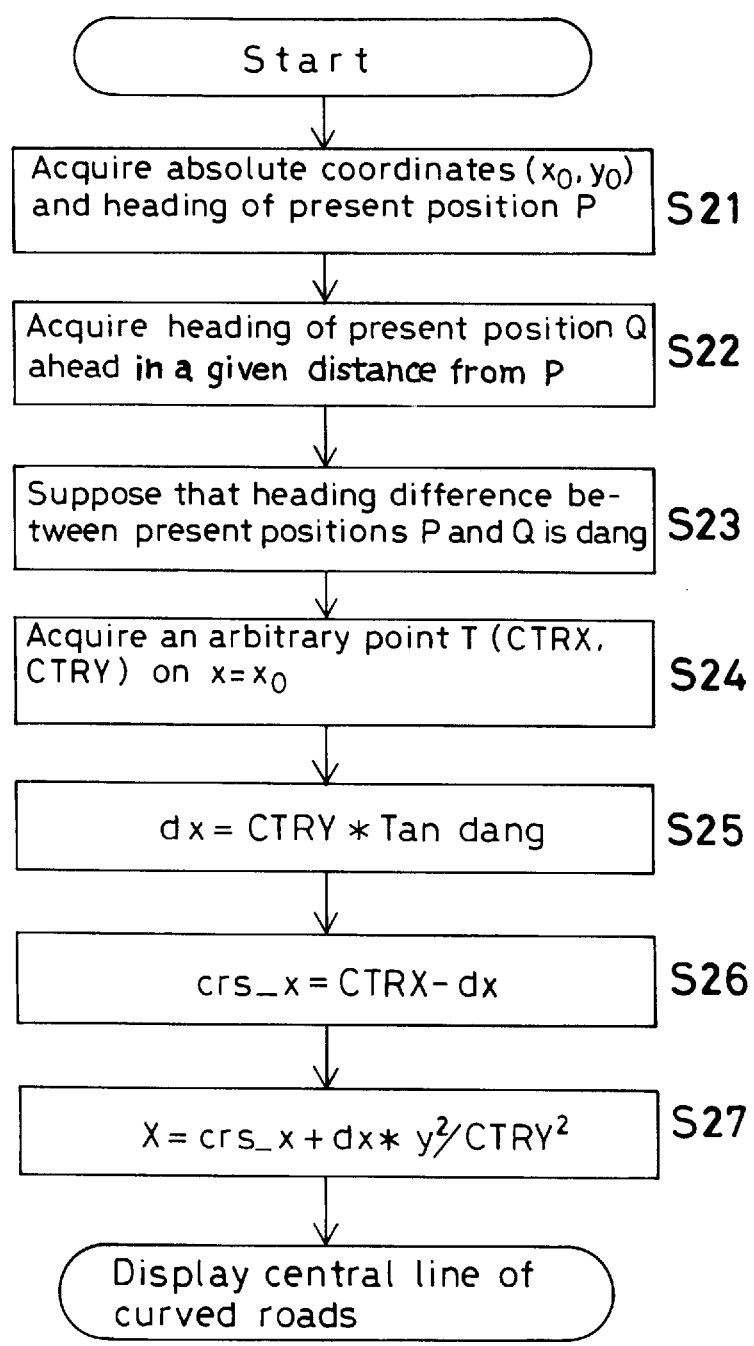
FIG. 6 is a flow chart of a subroutine for drawing curved lines for display in FIG. 5 (step S16)
Figure 7:
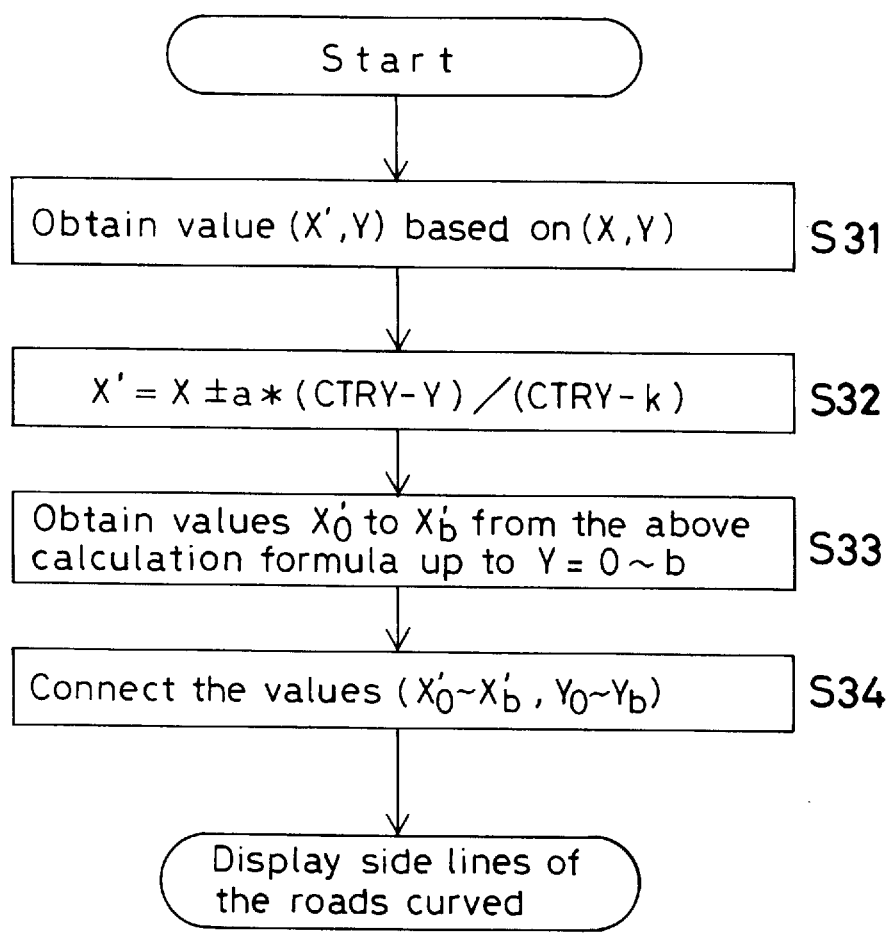
FIG. 7 is a flow chart showing another subroutine for further drawing curved lines in step S16 of FIG. 5.
Figure 8:
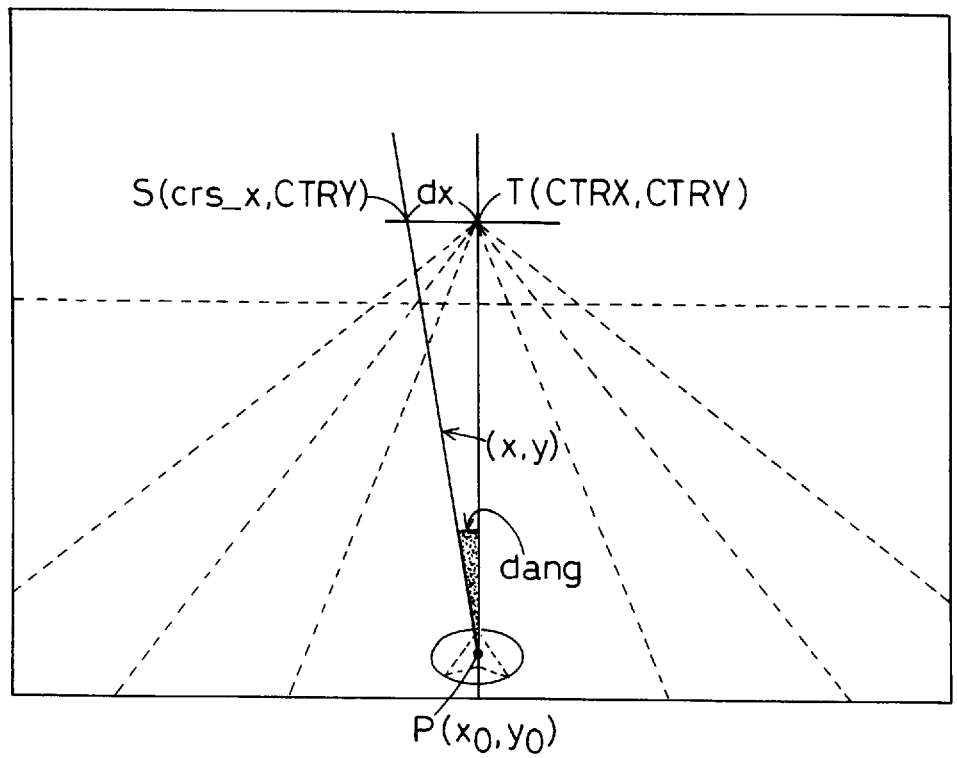
FIG. 8 is a graph illustrating the processing of FIG. 6.
Figure 9:
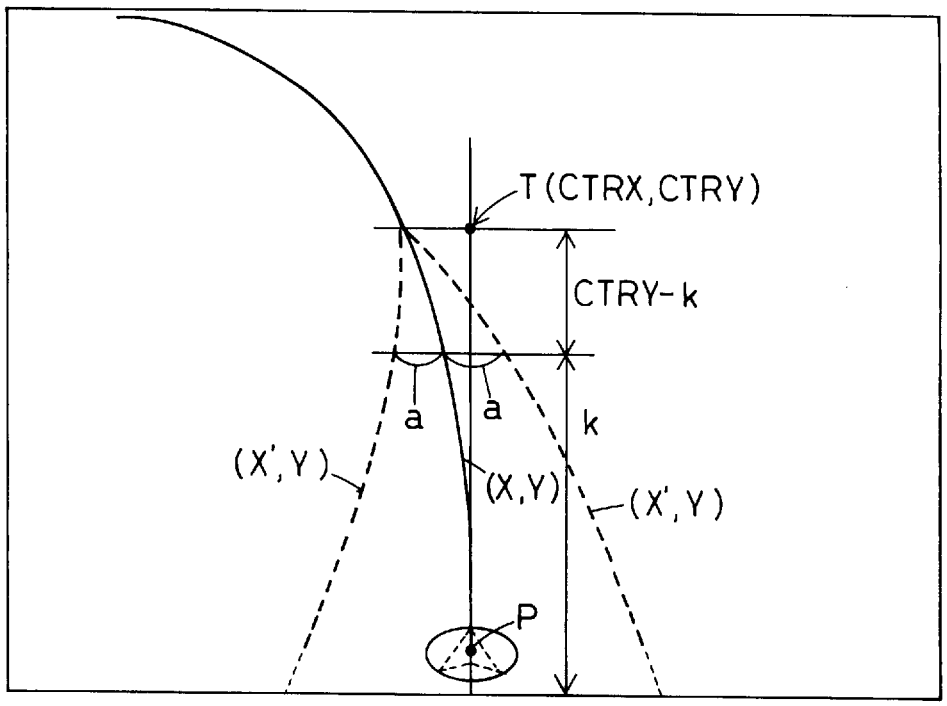
FIG. 9 is a graph illustrating the processing of FIG. 7.

FIG. 6 and FIG. 7 each represent a flow chart of processing to draw a curved line in FIG. 5. FIG. 8 and FIG. 9 are the drawings for explaining the processings of FIG. 6 and FIG. 7 respectively. FIG. 6 represents processings to draw the central line (X,Y) of a curved road. Absolute coordinates $(x_0,y_0,)$ and heading of the present position P are acquired in Step S21, and heading of the present position Q at a given distance ahead of the present position P is acquired in Step S22. Next, the difference of heading "dang" between the present positions P and Q is obtained in Step S23, and an arbitrary point T (CTRX, CTRY) on $x=x_0$ is acquired in Step S24. Then, the calculation in Steps S25 to S27 is performed.

Specifically, in FIG. 8, if it is supposed that a distance between the point T (CTRX, CTRY) and a point S (CRS_x, CTRY) having heading difference "dang" is dx, then the following relationship exists at a point (x,y) on a straight line connecting the points P and S:

$$dx=CTRY*\text{Tan } dang$$

$$CRS\_x=CTRX-dx$$

To convert the straight line (x,y) to a curved line (X,Y) shown in FIG. 9, the following equations are used:

$$X=CRS\_x+dx*y^2/CTRY^2$$

$$Y=y$$

When each point on (x,y) is substituted in the above equations and calculation is made, the central line (X,Y) of the road shown in FIG. 9 can be drawn.

Next, based on the central line (X,Y) of the road from FIG. 7, side lines (X',Y) on left and right are obtained, where road width is converged to 0 toward the point S as shown in FIG. 9. In FIG. 9, it is supposed that a given point on Y axis on the screen is k, and that road width at the point k is "a". This is to draw a road having a desired width approximately at the center of the screen. In Steps S32 to S34, using the equation:

$$X'=X\pm a*(CTRY-Y)/(CTRY-k)$$

and substituting the values of Y=0 to b into it, the values up to $X'_0$ to $X'_b$ are obtained. When the values of $(X'_0-X_b, Y_0-Y_b)$ are connected with each other, it is possible to draw the side lines (X',Y) at left and right as shown in FIG. 9.

To draw straight lines for a road, the central line of the road and a plurality of side lines are drawn in straight lines from the predetermined point T toward the lower portion of the screen in FIG. 8.

Figure 10:
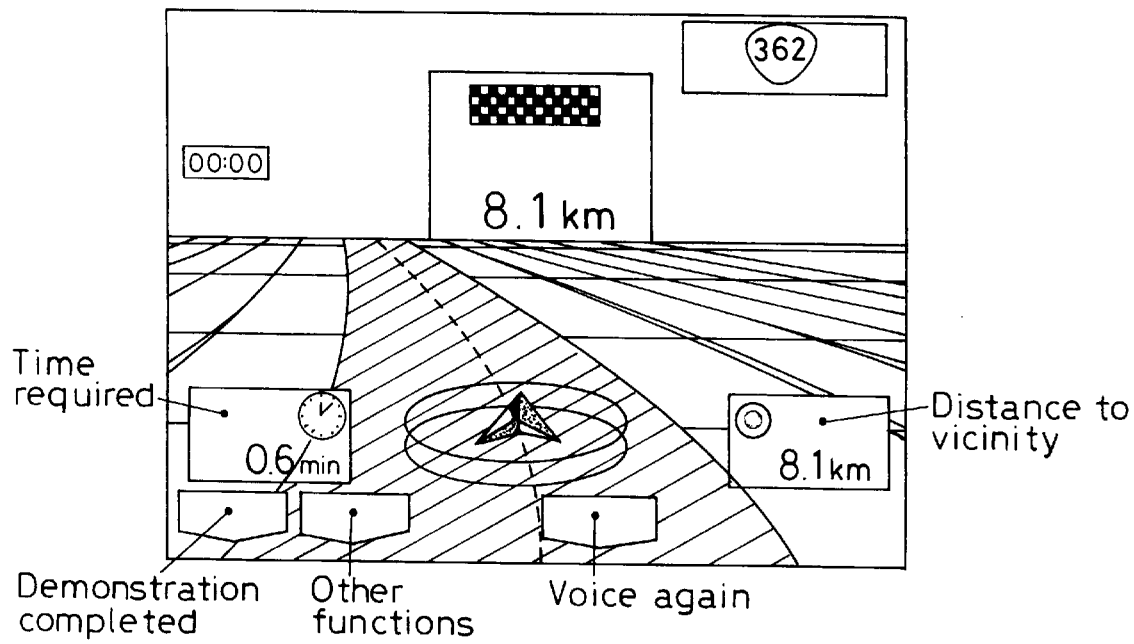
FIG. 10 is an illustration of a display screen where a road is drawn in curved lines.

FIG. 10 shows an example of the screen where the road is drawn in curved lines. By drawing a plurality of side lines at left and right of the central line of the road, the road can be displayed 3-dimensionally, and it is possible to confirm how the vehicle is driven along the curved line and how the road is curved on the screen.

Figure 11:
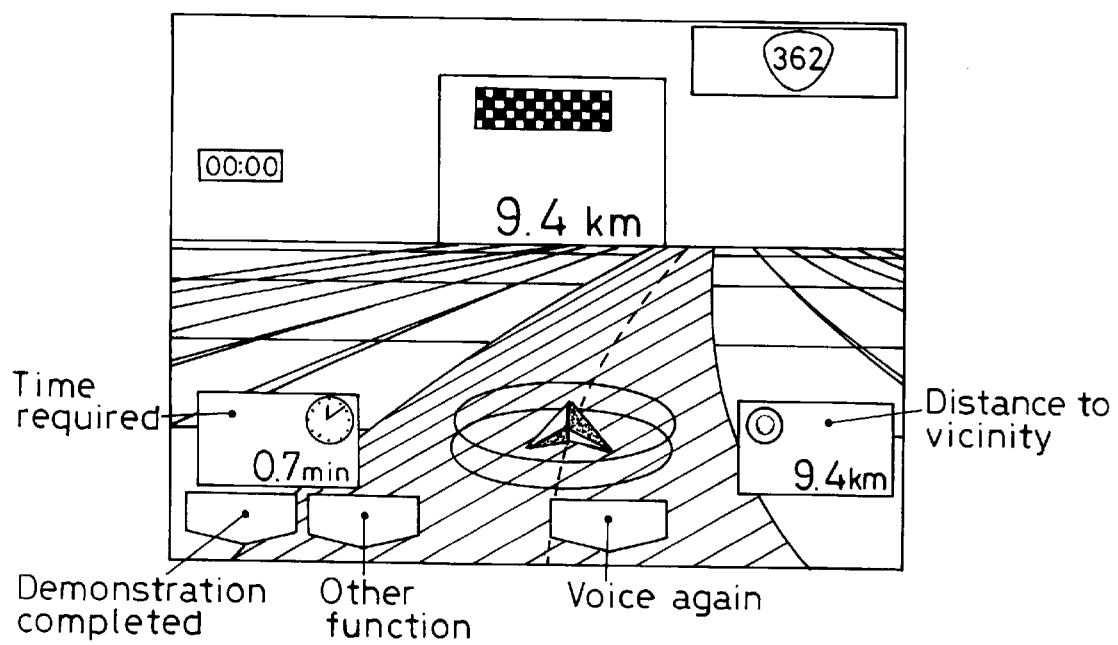
FIG. 11 is an illustration of a display screen where a road is drawn in straight lines.

FIG. 11 represents an example of the screen where the road is drawn in straight lines. Based on the route information from the present position of the vehicle to a position ahead at a given distance, the road is not only drawn 3-dimensionally, but a plurality of route information items are displayed on a map visualized on the screen. For example, the names of the points or areas in the advancing direction such as interchanges, junctions, parking areas, etc. to be suggested during high-speed driving, remaining distance from the present position of the vehicle to the facility or point with the displayed name and expressway information for facilities such as a filling station at the place with the displayed name are shown. In FIG. 11, the expressway information for "Monyama PA (parking area)" which is the closest from the present position of the vehicle, is displayed. When the user specifies "Kasugai IC (interchange)" or "Komaki JCT (junction)", i.e. places ahead of "Monyama PA", the expressway information of "Kasugai IC" or "Komaki JCT" can be displayed. Therefore, no complicated map is shown and route information for the present position of the vehicle and the area immediately ahead of the present position is displayed 3-dimensionally. Thus, map information of an area ahead during driving can be confirmed easily, and this ensures safe and accurate driving by the driver.

Figure 12:
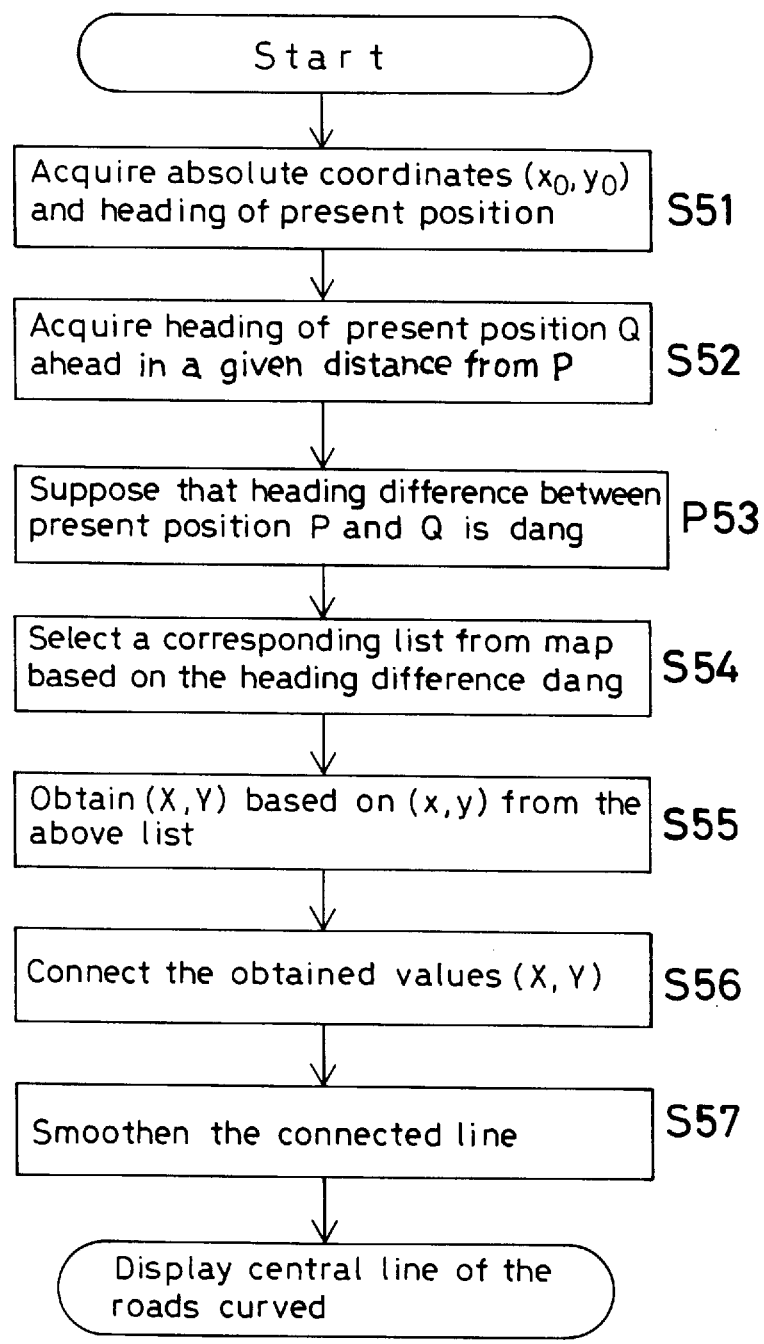
FIG. 12 a flow chart of a second embodiment of a subroutine for processing by the route information converting means of the present invention (step S5 in FIG. 3)

FIG. 12 and FIG. 13 relate to another aspect of the processings in the route information converting means in the present invention. FIG. 12 is a flow chart of display processing, and FIG. 13 is a drawing for explaining data arrangement of the processing. In this embodiment, conversion maps for converting from straight line (x,y) to curved line (X,Y) are prepared for each heading difference "dang" as shown in FIG. 13. In FIG. 12, Steps S51 to S53 are the same as in the processings of FIG. 6. In Step 54, a corresponding list is selected from the conversion map data shown in FIG. 13 based on the heading difference "dang", and the value (X,Y) is obtained based on the value (x,y) from the above list in Step S55. Then, the value (X,Y) as obtained in Step S56 is connected. By smoothening the line connected in Step S57, the central line of a curved road is displayed. The side lines at left and right are obtained by processing (X,Y) acquired in Step S56 according to the flow chart of FIG. 7.

Next, description will be given on another embodiment of the invention referring to FIG. 14 to FIG. 29. The embodiment relates to a vehicular navigation system, in which marks such as arrows for indicating advancing direction at a guide branch point or guide intersection (hereinafter referred as "guide branch point") on a leading route.

In the vehicular navigation system of this embodiment, there is provided a guidance control means for changing display position of the advancing direction at a second guide branch point to match the advancing direction at a first guide branch point and for displaying the advancing direction at the second guide branch point at the same time. The guidance control means is provided with a function to display the advancing direction at each guide branch point when the two guide branch points are adjacent to each other at a distance shorter than the predetermined distance and also with a function to highlight or emphasize guidance information of advancing direction at the first guide branch point. The guidance control means is also provided with a function to display the advancing direction guidance information at the first guide branch point at the upper center of the display screen and to display the advancing direction guidance information at the second and subsequent guide branch points at the upper right or left of the display screen or to overlap the guide branch points, stacked one after another with the nearer point indicated in the top window of the stack (lowermost window on the screen).

In the vehicular navigation system of the present invention, display position of the advancing direction at the second guide branch point is changed according to the advancing direction at the first guide branch point. As a result, when the driver recognizes the advancing direction guidance at the next guide branch point, the driver can recognize the advancing direction guidance information of the guide branch point after the next. Because advancing direction at each guide branch point is displayed when the distance between the guide branch points is short, it is easily recognized that the guide branch points are adjacent to each other. For example, when the vehicle must be turned left immediately after turning to right, the driver can drive the vehicle at ease. By highlighting or emphasizing the advancing direction guidance of the first guide branch point, the driver can easily recognize the next advancing direction guidance. By overlapping the advancing direction guidance of the first guide branch point with emphasis, priority of guidance is more clearly indicated, and the driver can easily recognize the next guidance. In the guidance for the advancing direction, the advancing direction guidance information at the first guide branch point is displayed at the upper center of the display screen, and the advancing direction guidance information for the second and subsequent guide branch points is displayed at the upper right or left of the display screen with the nearer guide branch point uppermost. Every time the vehicle passes through a guide branch point, the uppermost advancing direction guidance information (i.e. on top of the others) is moved to upper center of the display screen as the advancing direction guidance at the first guide branch point. When the vehicle approaches the destination, the driver can recognize that the number of turning points where the vehicle is to be turned has decreased because the remaining items of the advancing direction guidance displayed on the screen have decreased.

FIG. 14 to FIG. 16 show examples of major data files stored in the information storage unit 3 of FIG. 1 according to the present embodiment. FIG. 14(A) represents a guidance road data file, in which the route determined by the route searching means and the data necessary for route guidance is stored. For each of the number of roads (n), it consists of various data such as road number, length, road attribute data, address and size of configuration data, and address and size of guidance data. The road number is set for each direction (outward course and return course) and for each road segment between branch points. The road attribute data serving as road guidance auxiliary information data include the data indicating that the road is overpass, road alongside overpass, underpass, or road alongside underpass, and information on number of lanes as shown in FIG. 15(A). The configuration data contain coordinate data including east longitude and north latitude for each several meters of the node when each road is divided into a plurality of nodes as shown in FIG. 14(B).

The guidance data include the data such as name of intersection (or branch point, precaution point data, road name data, address and size of road name voice data, and address and size of destination data. The precaution data are the data indicating railroad crossing, tunnel entrance, tunnel exit, road width narrowing point etc., warning the driver at railroad crossing, tunnel, etc., i.e. data other than the branch point data, as shown in FIG. 16(A). The road name data includes information of the type of road such as expressway, municipal expressway, toll road, general road (national road, prefectural road, other road), and information such as main line or approach road for expressway, municipal expressway and toll road as shown in FIG. 15(B).

The data comprise the road type data and in-type number, i.e. individual number data for each road type.

The destination data are the data such as destination road number, destination name, address and size of destination name voice data, destination direction data, and driving guidance data as shown in FIG. 14(D). The destination direction data give information such as "invalid" (destination direction is not used), "unnecessary" (no guidance is necessary), "go straight ahead", right ward direction, diagonally rightward direction, direction to return to right, leftward direction, diagonally leftward direction, and direction to return to left. The driving guidance data include the data for guidance as to which lane the vehicle should be driven along when there are a plurality of lanes as shown in FIG. 16(B), indicating information such as bear right, bear left, bear toward the center or no suggestion.

Figure 17:
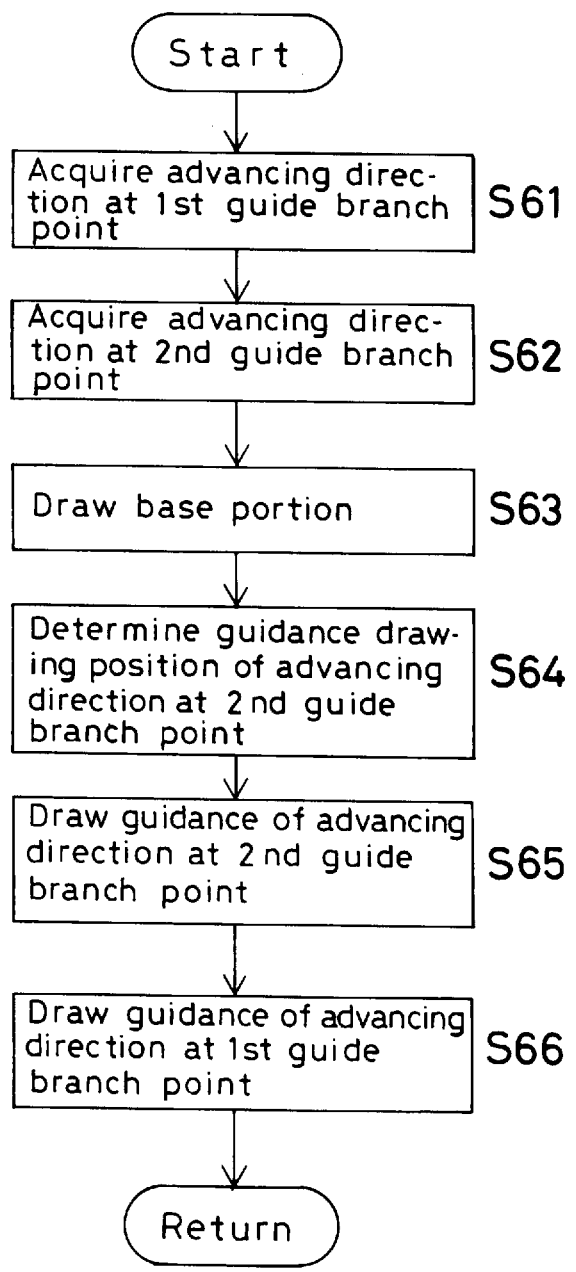
FIG. 17 is a flow chart of a subroutine for generating a display of a sector view screen.
Figure 18A:
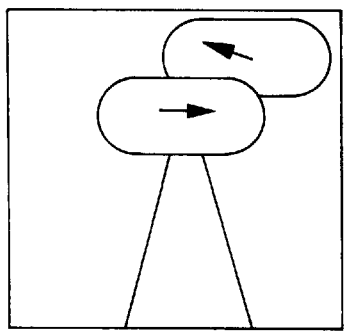
FIGS. 18(a), 18(b) and 18(c) are schematic illustrations of advance direction guidance screens.
Figure 18B:
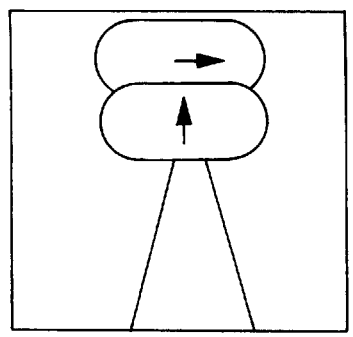
Figure 18C:
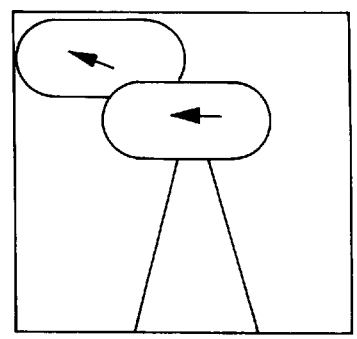

Next, description will be given on the flow of processings of the vehicular navigation system of the present invention. FIG. 17 is a flow chart of the processing to draw a sector view for advancing direction guidance, and FIG. 18 shows advancing direction guidance screens. The present embodiment is characterized in that, based on the advancing direction at the first guide branch point, the position to draw or visualize the advancing direction guidance information at the second guide branch point is changed.

Explaining the drawing processing, from the destination direction data (FIG. 14(E)) of the destination data shown in FIG. 14(D) stored in the information storage unit, advancing directions at the first and the second guide branch points are acquired (S61, S62), and the base portion of the road is drawn at the center of the screen (S63). Then, based on the advancing direction at the first guide branch point, drawing point of the second guide branch point is determined (S64), and the advancing direction (arrow mark in FIG. 18) at the second guide branch point is drawn at this position (S65). Next, the advancing direction at the first guide branch point is drawn by partially overlapping on the advancing direction at the second guide branch point at the upper center of the screen (on the road) (S66). For example, in case the advancing direction at the first guide branch point is rightward direction as shown in FIG. 18(*a*), drawing position of the second guide branch point is determined at right or at upper right ahead of the advancing direction. As shown in FIG. 18 (*b*), in case the advancing direction at the first guide branch point is a direction straight ahead, the drawing position of the second guide branch point is determined at upper position ahead of the arrow of the advancing direction. In case the advancing direction at the first guide branch point is leftward direction as shown in FIG. 18(*c*), the drawing position of the second guide branch point is determined at upper left ahead of the advancing direction.

In this way, the drawing position of the second guide branch point is determined based on the advancing direction at the first guide branch point, and, when the driver recognizes the next guidance, it is possible to recognize the guidance information after the next. Also, as shown in FIG. 18, the first advancing direction mark is partially overlapped and displayed on the second advancing direction mark. Because the first advancing direction guidance is displayed with highlight or emphasis, priority of the advancing direction guidance information can be clearly seen, and the next advancing direction guidance can be easily recognized. As the method to emphasize, various methods can be adopted in addition to overlapping display, e.g. displaying the first advancing direction mark in larger size, with thicker line, by changing color, with different pattern, or by flashing display.

Figure 19:
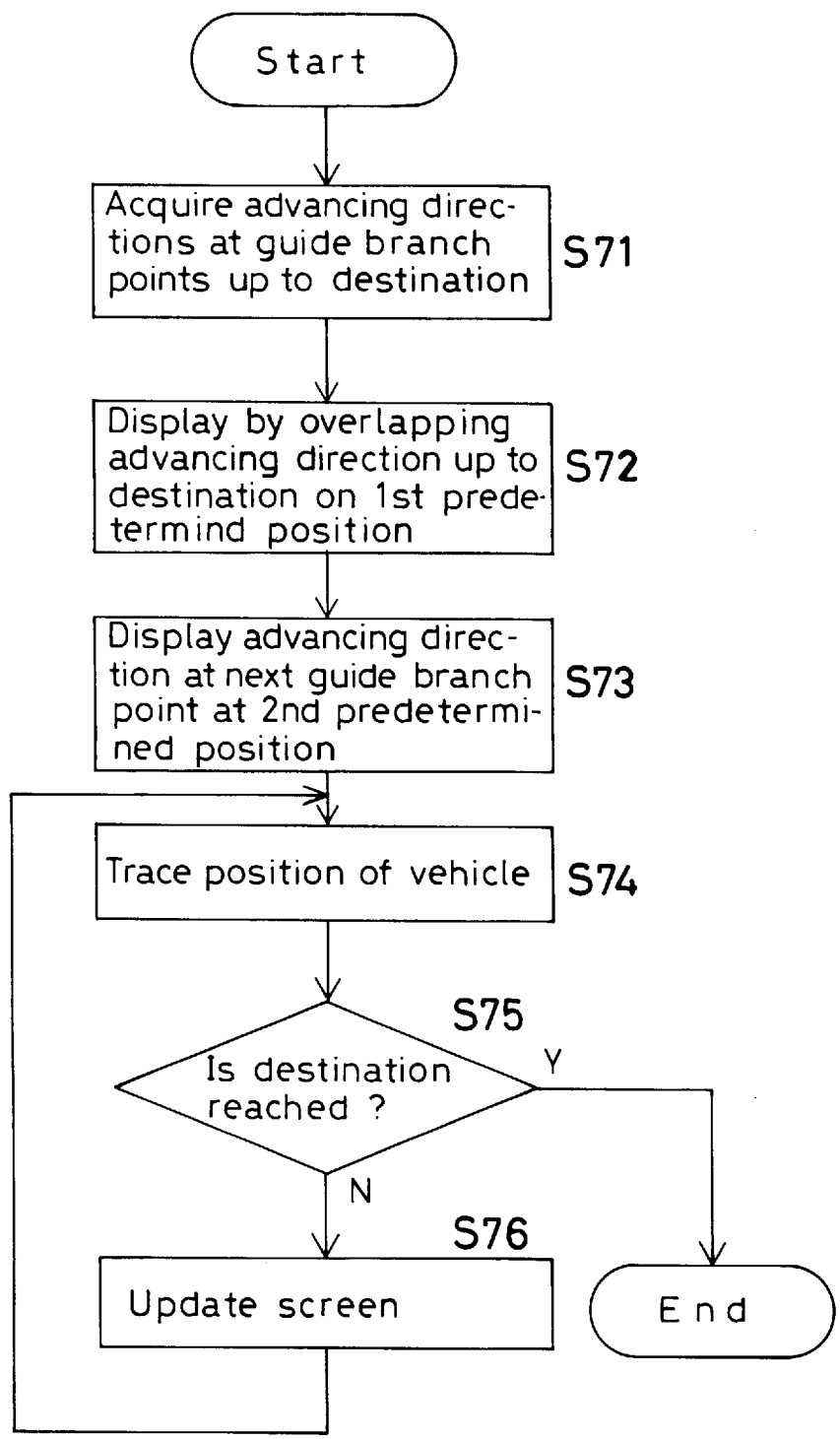
FIG. 19 is a flow chart of a subroutine for generation of an advance direction guidance display screen.

Next, description will be given on sequential overwriting of advancing direction guidances up to the destination referring to FIG. 19 and FIG. 20. In this example, display positions of the advancing direction guidance marks are as shown in FIG. 18. FIG. 19 is a flow chart of display processing of advancing direction guidance, and FIG. 20 represents a screen displayed by the display processing.

In FIG. 19, advancing direction at all guide branch points up to the destination are acquired from the destination direction data (FIG. 14(E)) of the destination data shown in FIG. 14(D) stored in the information storage unit (S71), and the advancing directions are written in layers at the first predetermined position with the advancing direction at the guide branch point nearest to the present position placed at the uppermost layer (S72). By this processing, the advancing direction in the uppermost window of the stacked windows is a right turn mark as shown at upper right of the display screen in the example of FIG. 20, and it is clear from the display that the advancing direction marks of the subsequent guide branch points are all under it one after another. The road is displayed at the center of the screen, and the present position is indicated by a mark Δ encircled by ○.

Then, the advancing direction of the next guide branch point is displayed at a second predetermined position (S73). By this processing, a right turn arrow at the next guide branch point is displayed at upper center of the screen in the example of FIG. 20. A part of the area of the right turn arrow mark for guiding the advancing direction at the next guide branch point is partially overlapped on the area of the next left turn arrow mark, and the next advancing direction guidance mark is displayed with emphasis. By the present position detecting unit, the position of the vehicle is traced, and it is judged whether or not the vehicle has reached the destination. Until it reaches the destination and each time the passing of the guide branch point is detected, the screen is updated, and advancing direction guiding marks at the next guide branch point and the guide branch point after the next are newly displayed. Updating of the screen is executed, for example, as follows: The advancing direction mark of the second predetermined position displayed so far is erased, and the advancing direction mark of the next guide branch point is newly displayed at the second predetermined position. At the same time, the advancing direction guiding mark of the next guide branch point is displayed at the first predetermined position.

Figure 20:
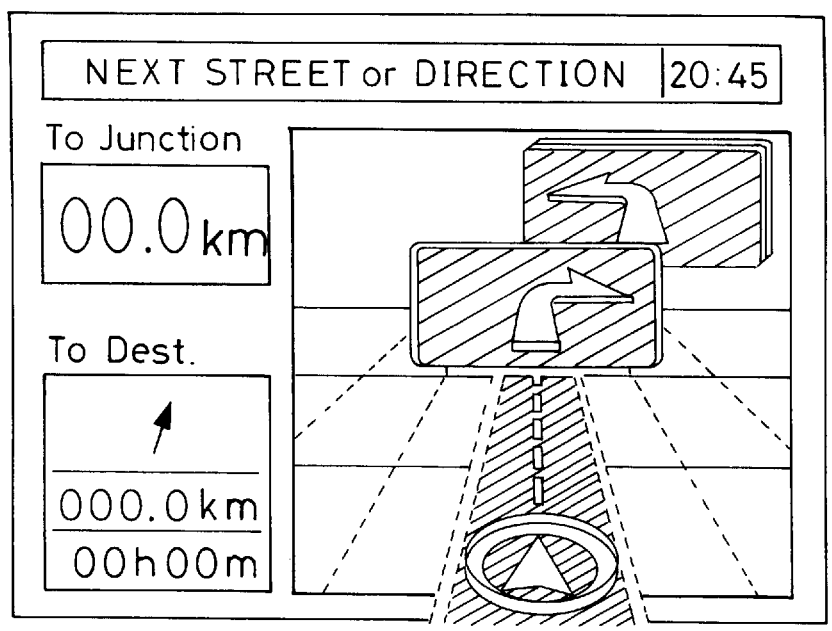
FIG. 20 is an illustration of an example of a complete guidance display screen.

In the example of FIG. 20, the advancing direction mark at the guide branch point after the next is overlapped in layers up to the destination, and by counting the number of layers (overlapped windows) on the screen, it is possible to find out the number of the guide branch points to be driven through. Therefore, by counting the number of the remaining layers of the advancing direction mark after the next, it is possible to recognize that the number of turning points where the vehicle is to be turned has decreased when the vehicle approaches the destination. When only one advancing direction guiding mark is left, the information (mark) of the destination is finally displayed, and display processing of the advancing direction guidance is completed when the vehicle reaches the destination.

Figure 21:
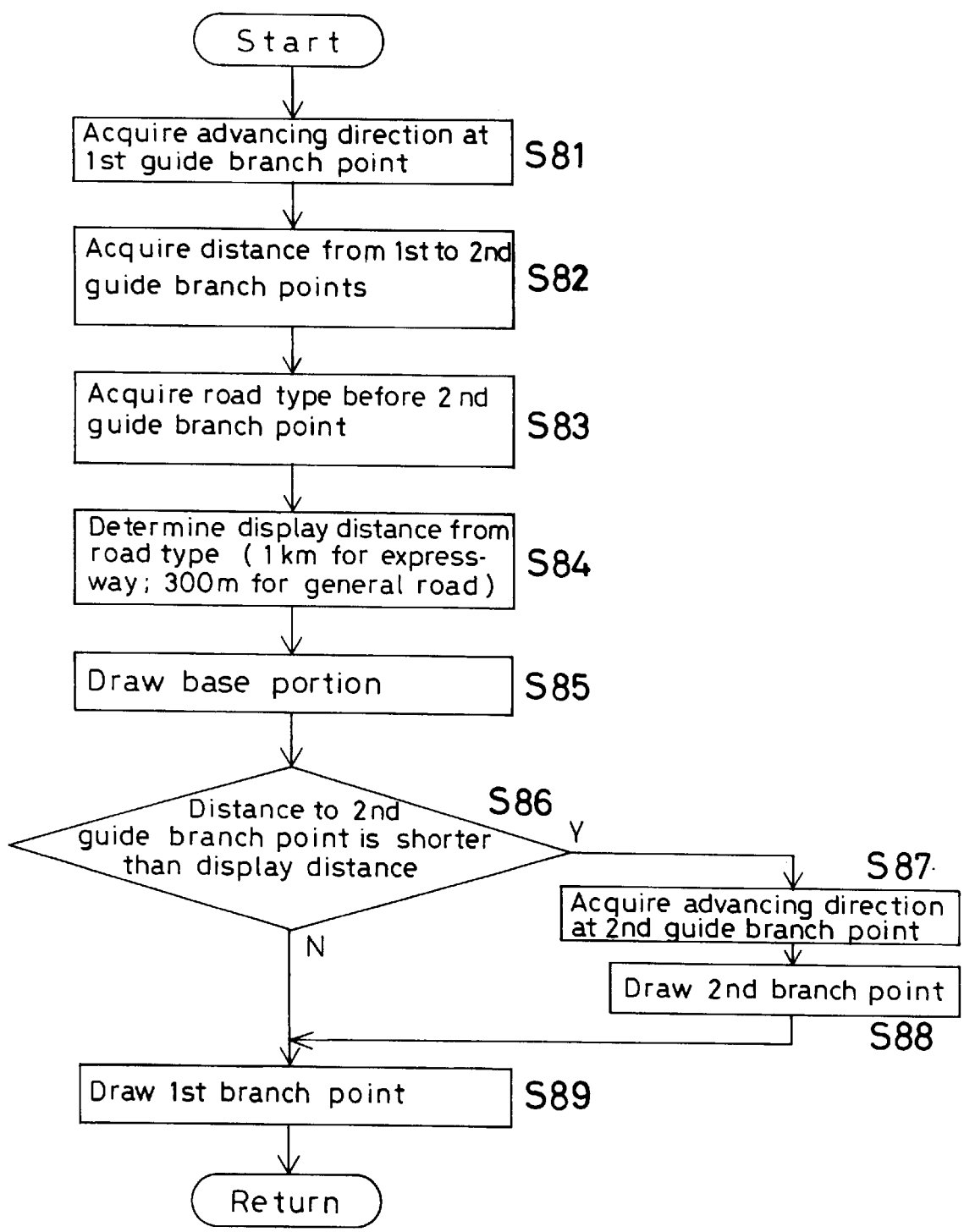
FIG. 21 is a flow chart of another subroutine for generation of a sector view drawing screen.
Figure 22:
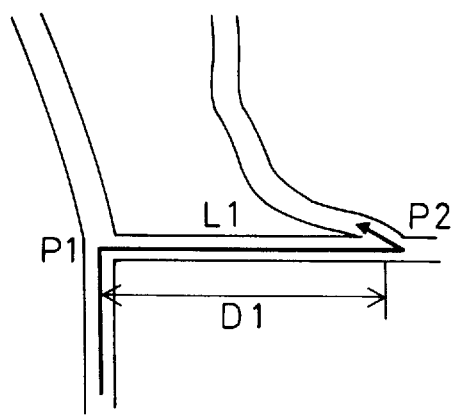
FIGS. 22(a) and 22(b) illustrate the manner in which advance guidance displays are generated.

FIG. 21 is a flow chart of a routine for sector view drawing for advancing direction guidance of the present embodiment. FIG. 22 represents drawings for advancing direction guidance display, and FIG. 23 shows screens of advancing direction guidance.

Figure 22B:
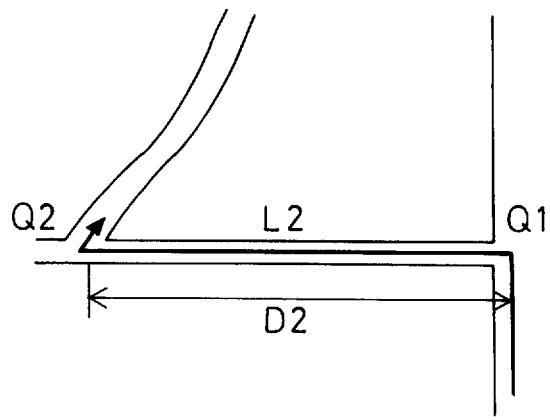
Figure 23A:
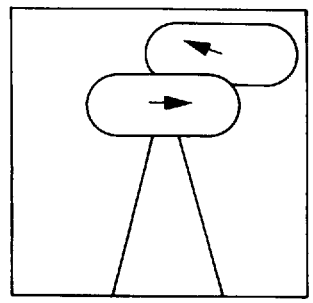
FIGS. 23(a) and 23(b) are schematic illustrations of advance direction screens for guidance at branch points.
Figure 23B:
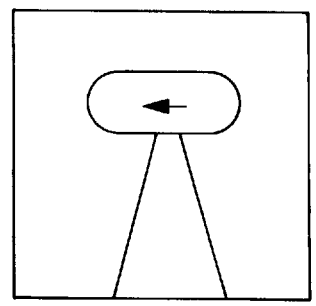

Description is given now on a case where, as shown in FIG. 22(a), a second guide branch point P2 is at a point at shorter distance D1 from a first guide branch point P1 and the leading route turns in the rightward direction at the guide branch point P1 and in the leftward direction at the guide branch point P2 as shown in FIG. 22(a), and also a case where, as shown in FIG. 22(b), a second guide branch point Q2 is at a position at a longer distance D2 from a first guide branch point Q1, and the leading route turns in the leftward direction at the guide branch point Q1 and in the rightward direction at the guide branch point Q2.

In the processing of FIG. 21, the advancing direction of the first guide branch point (P1,Q1) is acquired from the destination direction data (FIG. 14(E)) of the destination data shown in FIG. 14(D) stored in the information storage unit (S81). Next, the distance (D1,D2) from the first guide branch point to the second guide branch point is acquired from the guidance road data of FIG. 14(A) (S82), and the data of road type, i.e. whether it is general road or expressway, is acquired from the road name data of FIG. 16(B) (S83). Then, a display distance is determined by the road type (S84). The display distance is a preset distance necessary for determining whether or not two advancing directions are to be displayed, and it is, for example, 1 km for an expressway, and 300 m for a general road.

Next, the base portion of road is drawn or visualized (S85), and it is judged whether the distance up to the second guide branch point (D1, D2) is shorter than the display distance (S86). For example, in case the distance D1 is short as shown in FIG. 22(a) and the guide branch point P2 is within the display distance, the advancing direction at the second guide branch point P2 is acquired from the destination direction data (FIG. 14(E)) of the destination data shown in FIG. 14(D) stored in the information storage unit and it is drawn on a predetermined area. Partially overlapped on this area, the advancing direction at the first guide branch point P1 is drawn in a given area (FIG. 23(a)). On the other hand, in case the distance D2 is long as shown in FIG. 22(b) and the guide branch point Q2 is out of the display distance, only the advancing direction at the first guide branch point Q1 is drawn in the predetermined area (FIG. 23(b)).

As described above, the display distance is set and information on two advancing directions is displayed only when the guide branch points are adjacent to each other. Even when the guide branch points where the vehicle should be turned are adjacent to each other, the driver can find out which way the vehicle is to be directed at an earlier opportunity. Thus, the driver can drive the vehicle easily and accurately. For example, when the vehicle should be turned left immediately after a right turn, the driver can drive the vehicle at ease and with full confidence.

Figure 24:
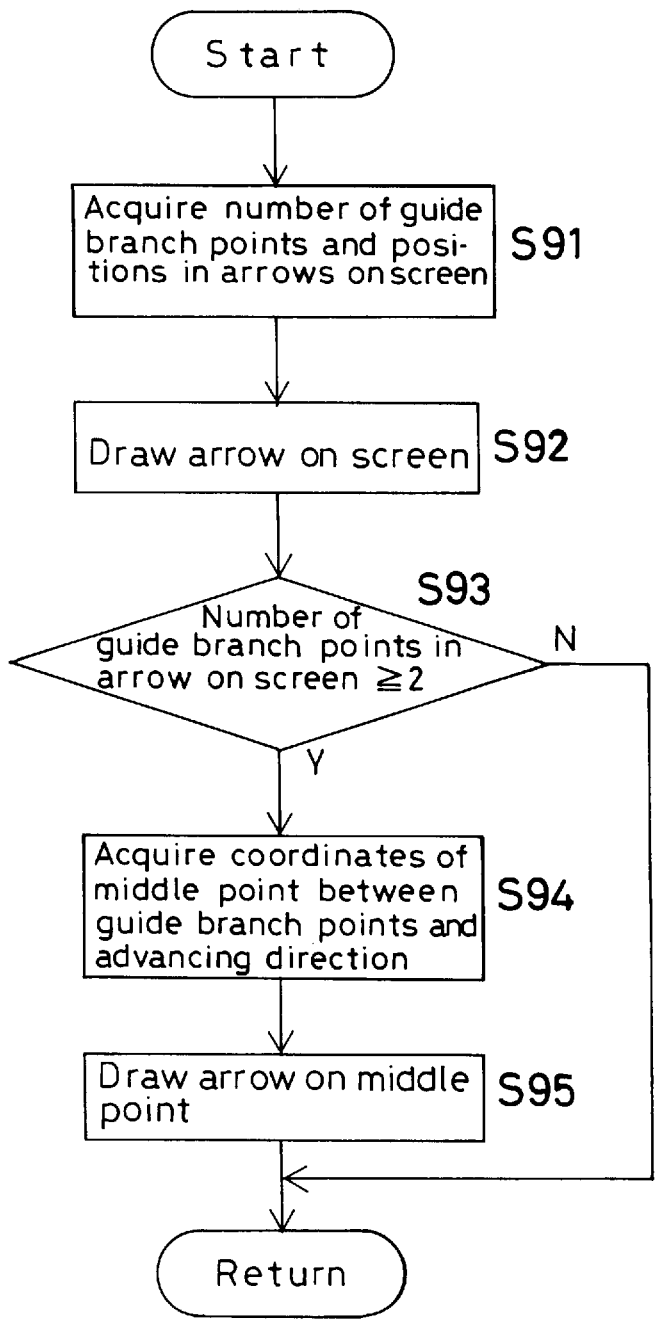
FIG. 24 is a flow chart of a subroutine for generation of a display wherein an arrow indicating the direction of advance is divided.

Next, description will be given on advancing direction guidance when there is a guide branch point indicated on an intersection screen, referring to FIG. 24 and FIG. 25. FIG. 24 is a flow chart of a drawing processing for a case where the advancing direction arrows at the first guide branch point and the second guide branch point are displayed separately, and FIG. 25 shows an intersection screen.

Figure 25:
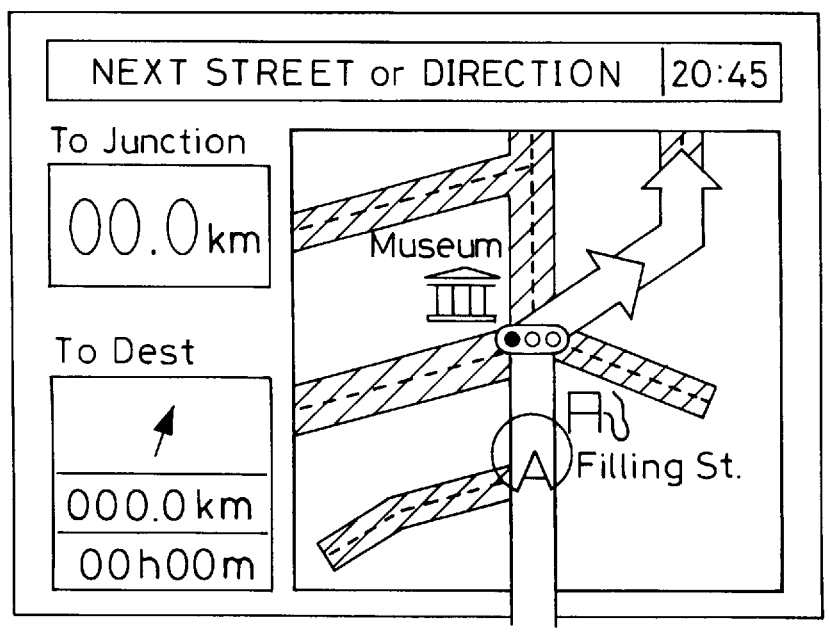
FIG. 25 is an illustration of an intersection display screen.

As shown is FIG. 25, when an intersection screen is displayed and two or more guidance data showing advancing directions are to be displayed, the number of guide branch points and the positions are acquired from the guidance road data and guidance data of FIGS. 14(A) and 14(C) stored in the information storage unit (S91), and an arrow mark is drawn, for example, in the screen (S92). The arrow mark is drawn along the leading route and on it. In case there are two or more guide branch points in the arrow drawing of in Step S93, the advancing direction guidance information is divided and drawn (S94). That is, coordinates of the middle point between the guide branch points are obtained, and heading is acquired from the destination direction data (FIG. 14(E)) of the destination data shown in FIG. 14(D), and the arrow is drawn at the middle point. As a result, the arrow mark is divided and drawn. This makes it possible to find out the advancing direction very easily and to provide reliable guidance.

Figure 26:
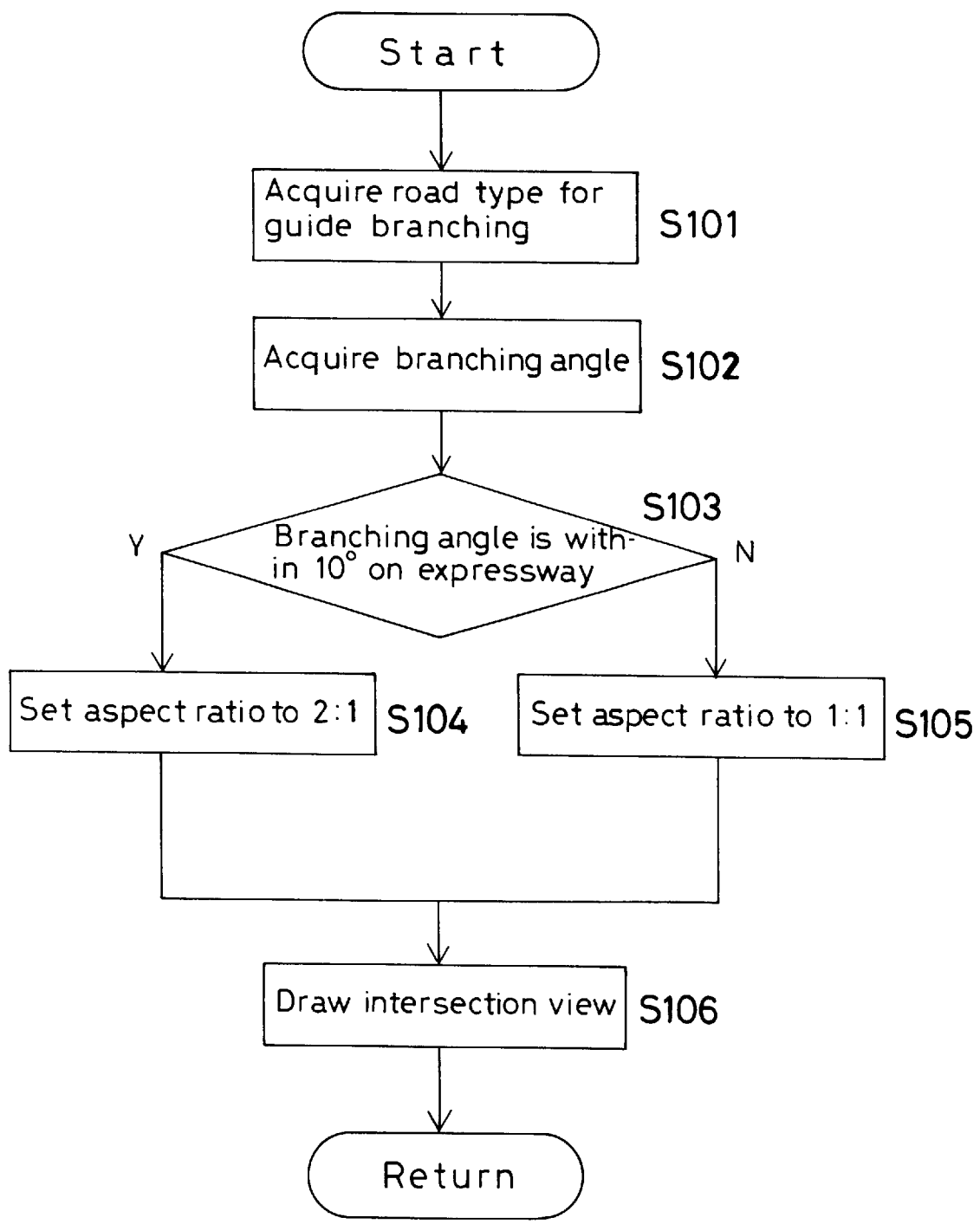
FIG. 26 is a flow chart of a subroutine for generating a display of an intersection enlarged two times in the lateral direction.
Figure 27A:
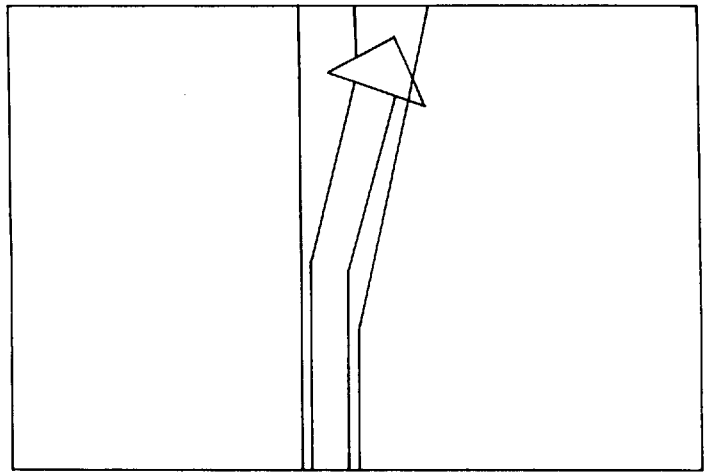
FIG. 27(a) represents a display screen enlarged by the same magnification in longitudinal and lateral directions and FIG. 27(b) represents a display screen enlarged two times in the lateral direction.
Figure 27B:
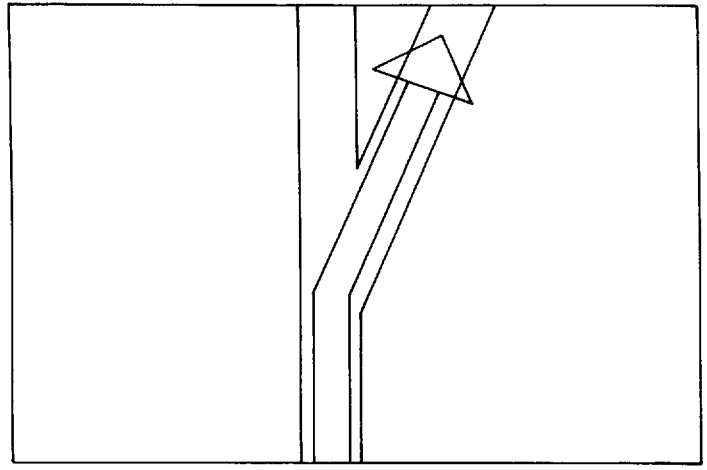
Figure 28:
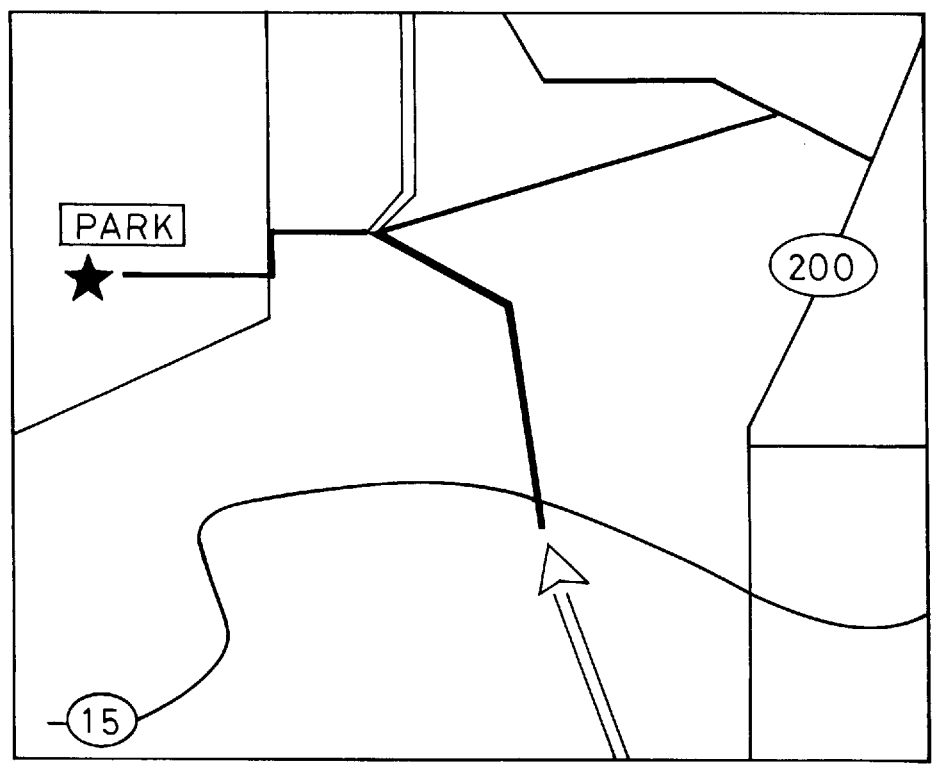
FIG. 28 represents a screen display of a map showing the leading road.
Figure 29:
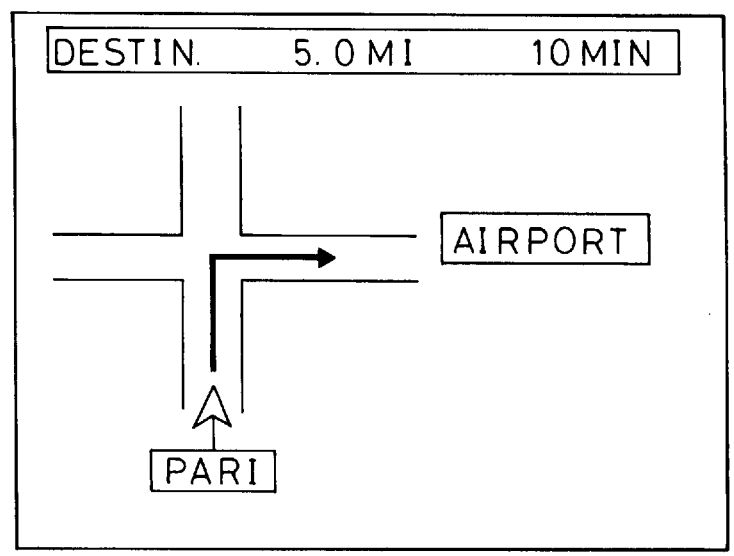
FIG. 29 represents a screen display of an enlarged map of an area near a guide branch point.

Next, description will be given for a case where branching at a narrow (smaller) angle on an expressway is displayed for easy understanding, referring to FIG. 26 and FIG. 27. On an expressway, when the road is branched at a narrow (smaller) angle, even when the advancing direction as explained above is displayed, it is often difficult to judge which road the advancing direction indicates. In such a case, the narrow angle may be displayed by widening it in lateral direction of the screen.

From the guidance road data of FIG. 14(A) stored in the information storage unit and the road name data of FIG. 14(B), the road type and branching angle to enter the guide branch point are acquired (S101, S102). Next, under the condition that it is branched off from an expressway and that branching angles of all roads departing from the branch point are narrow, it is drawn with change of the aspect ratio. For example, in case the branching angle is larger than 10 degrees in Step S103, the intersection picture is drawn with the aspect ratio still at 1:1 (FIG. 27($a$)). If the branching angle is within 10 degrees, the intersection picture is drawn by setting the aspect ratio to 2:1 (FIG. 27($b$)). For example, if it is supposed that a map is drawn normally on the display screen at a size of 300 m (length)×300 m (width), and if the aspect ratio is changed to 2:1, the map should be drawn to have the size: 300 m (length)×150 m (width). For this purpose, if it is supposed that the drawing standard to the display screen when drawing the map is normally set to 10 dots for 100 m, it is adjusted that only the drawing standard for lateral direction is to be set to 10 dots for 50 m. If the positions of the nodes to form the road are determined when the map is drawn and the road is drawn with sufficient widths in both directions, with the line connecting the nodes as the central line, the road can be drawn only by widening the angle at the branching point in the lateral direction. In this way, the advancing direction turning through a narrow angle on the expressway can be displayed and clearly distinguished from the other roads. In the above, while explanation has been given on the application to an expressway, it is needless to say that this can also be applied to the case where the branching angle is narrow (small) in a general road and it is difficult to find the advancing direction from the advancing direction mark.

What is claimed is:

1. A vehicular navigation system, comprising:

present position detecting means for detecting the present position of a vehicle;

input means for inputting a destination;

information memory means for storing road data to be searched for determination of an optimal route;

route searching means for searching said road data to determine the optimal route to the destination;

route information converting means for calculating a road configuration from said road data for the detected present position and from road data for plural guidance points at spaced, predetermined distances in advance of the detected present position on the optimal route and for converting the calculated road configuration into visually and 3-dimensionally expressed route information according to the calculation; and display means for outputting and displaying the route information converted by the route information converting means;

wherein said route information converting means calculates an angle between a heading for the present position of the vehicle and a heading for a position a given distance ahead from the present position of the vehicle, at a predetermined time interval, draws a road in straight line if the angle is less than a predetermined value, and draws the road in curved line if the angle is equal to or more than the predetermined value.

2. A vehicular navigation system according to claim 1 wherein said route information converting means determines if said present position and said two advanced points are aligned and, if not aligned, calculates a single continuous curve running through the present position and said two advanced points, as said road configuration.

3. A vehicular navigation system according to claim 1, wherein said calculated configuration road consists of a central lane and side lanes at left and right and wherein said display means displays the calculated configuration as a road width which gradually narrows toward an upper portion of the screen.

4. A vehicular navigation system according to claim 3, wherein, in drawing the road in straight line, the central line and the side lines at left and right of the road are drawn around a given point and toward a lower portion of the screen.

5. A vehicle navigation system according to claim 3, wherein, in drawing the road in curved line, said converting means converts a straight line connecting the present position with a position ahead at a given distance from the present position of the vehicle to said central line and side lines at left and right.

6. A vehicular navigation system according to claim 5, wherein said converting means calculates the central line and the side lines at left and right based on a calculation formula.

7. A vehicular navigation system according to claim 5, wherein said converting means obtains the central line and the side lines at left and right based on a conversion map.

8. A vehicular navigation system according to claim 1, wherein said display means reads advancing directions including an advancing direction at a first guide branch point where guidance is to be next given and an advancing direction at a second guide branch point after the first guide branch point, said first and second guide branch points being located on the determined optimal route in advance of the present position detected by the present position detecting means, and outputs and generates a separate display window for each of said advancing directions on a single display screen.

9. A vehicular navigation system according to claim 8, wherein said display means changes the position of the display window of advancing direction guiding information for the second guide branch point, relative to the position of the display window of advancing direction guiding information for the first guide branch point, based on the advancing direction at the first guide branch point.

10. A vehicular navigation system according to claim 8, wherein said display means generates the display windows for advancing directions at two guide branch points only if the distance between the two guide branch points is shorter than a predetermined distance.

11. A vehicular navigation system according to claim 8, wherein said display means outputs and displays the advancing directions in the display windows in such a manner that necessary advancing direction guidance can be easily recognized by emphasizing the display of advancing direction guiding information for the first guide branch point.

12. A vehicular navigation system according to claim 11, wherein said display window for advancing direction guiding information for the first guide branch point overlaps the display window for advancing direction guiding information at the second guide branch point.

13. A vehicular navigation system according to claim 11, wherein the emphasized display window for the advancing direction guiding information at the first guide branch point has larger marks, thicker lines, different colors, different patterns or flashing, to distinguish it from the remainder of the display.

14. A vehicular navigation system according to claim 8, wherein said display means positions the display window of the advancing direction guiding information for the first guide branch point at a position located in upper center of the display screen and overlapping the display windows of advancing direction guiding information for the second and subsequent guide branch points, each display window of advancing direction guiding information for the second and subsequent guide branch points being offset to the right or left of the display screen relative to the position of the display window of the advancing direction guiding information for the previous guide branch point.

15. A vehicular navigation system according to claim 8, wherein, in case a road is branched off at a guide branch point at a narrow angle, the road is drawn by widening the angle.

16. A vehicular navigation system according to claim 8, wherein the display window for advancing direction at the second guide branch point is offset, relative to an overlapping display window of advancing direction at the first guide branch point, in the advancing direction at the first guide branch point.

17. A vehicular navigation system according to claim 1, wherein said information memory means is an external storage medium, and a program for controlling navigation operation is stored in addition to said road data.

18. A vehicular navigation system according to claim 17, wherein said program includes a program for converting the route information near the present position of the vehicle to information for a visual and 3-dimensional display.

19. A vehicular navigation system comprising:
   present position detecting means for detecting the present position of the vehicle;
   input means for inputting information necessary for searching an optimal route;
   display means for displaying information for route guidance;
   information memory means for storing all data necessary for route guidance including guidance road data;
   route searching means for searching to determine a route based on the information inputted by said input means;
   route information memory means for storing information for the route determined by said route searching means; and
   guidance control means for reading, from said information memory means, advancing direction guiding information for plural guide branch points including an advancing direction at a first guide branch point for which guidance is to be next given and an advancing direction at a second guide branch point in advance of the first guide branch point, based on the route determined by the route searching means and the present position detected by said present position detecting means, for outputting information for separate display windows for each of said first and second advancing directions to said display means, and for changing the position of the display window for advancing direction guiding information at the second guide branch point, relative to position of the display window for advancing direction at the first guide branch point, in accordance with the advancing direction at the first guide branch point.

20. A vehicular navigation system according to claim 19, wherein, in case a road is branched off at a guide branch point at a narrow angle, the road is drawn by widening the angle.

21. A vehicular navigation system according to claim 19, wherein the display window of advancing direction at the second guide branch point is offset, relative to an overlapping display window of advancing direction at the first guide branch point, in the advancing direction at the first guide branch point.

22. A vehicular navigation system according to claim 19, wherein said guidance control means outputs the information for the display windows for advancing direction guiding information for the first and second guide branch points to said display means only if the distance between the first and second guide branch points is shorter than a predetermined distance.

23. A vehicular navigation system according to claim 22, wherein the next necessary advancing direction guidance is easily recognized by emphasizing the display window for advancing direction guiding information for the first guide branch point.

24. A vehicular navigation system according to claim 23, wherein said display window for the advancing direction guiding information for the first guide branch point is made to overlap the display window for the advancing direction guiding information for the second guide branch point.

25. A vehicular navigation system according to claim 23, wherein the display window of the advancing direction guiding information for the first guide branch point is emphasized by larger marks, thicker lines, different colors, different patterns or flashing to distinguish it from the remainder of the display.

26. A vehicular navigation system according to claim 22, wherein said display means positions the display window of the advancing direction guiding information for the first guide branch point at a position located in upper center of the display screen and overlapping the display windows of advancing direction guiding information for the second and subsequent guide branch points, each display window of advancing direction guiding information for the second and subsequent guide branch points being offset to the right or left of the display screen relative to the position of the display window of the advancing direction guiding information for the previous guide branch point.

* * * * *